(12) United States Patent
Ito et al.

(10) Patent No.: US 11,413,919 B2
(45) Date of Patent: Aug. 16, 2022

(54) STRUCTURAL MEMBER

(71) Applicant: NIPPON STEEL CORPORATION, Tokyo (JP)

(72) Inventors: Yasuhiro Ito, Tokyo (JP); Yoshiaki Nakazawa, Tokyo (JP); Takeshi Kawachi, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 16/766,618

(22) PCT Filed: Nov. 27, 2018

(86) PCT No.: PCT/JP2018/043549
§ 371 (c)(1),
(2) Date: May 22, 2020

(87) PCT Pub. No.: WO2019/103152
PCT Pub. Date: May 31, 2019

(65) Prior Publication Data
US 2021/0001675 A1    Jan. 7, 2021

(30) Foreign Application Priority Data
Nov. 27, 2017   (JP) .............................. JP2017-226969

(51) Int. Cl.
*B60G 7/00* (2006.01)
*B23K 31/02* (2006.01)
*B23K 101/00* (2006.01)

(52) U.S. Cl.
CPC .............. *B60G 7/001* (2013.01); *B23K 31/02* (2013.01); *B23K 2101/006* (2018.08);
(Continued)

(58) Field of Classification Search
CPC .............. B60G 7/001; B60G 2206/012; B60G 2206/122; B60G 2206/8201;
(Continued)

(56) References Cited

U.S. PATENT DOCUMENTS

| 2008/0007022 A1* | 1/2008 | Jones ...................... B60G 3/16 |
| | | 280/124.13 |
| 2008/0136136 A1 | 6/2008 | Kobier |

(Continued)

FOREIGN PATENT DOCUMENTS

| GB | 2528735 A | 2/2016 |
| JP | 8-188022 A | 7/1996 |

(Continued)

OTHER PUBLICATIONS

International Search Report for PCT/JP2018/043549 dated Feb. 26, 2019.

(Continued)

*Primary Examiner* — Darlene P Condra
(74) *Attorney, Agent, or Firm* — Birch, Stewart, Kolasch & Birch, LLP

(57) ABSTRACT

A structural member includes a top sheet portion which has a first edge portion and a second edge portion facing the first edge portion, a wall portion which extends from the second edge portion in a direction intersecting the top sheet portion, and a closed cross-sectional portion which is provided in the first edge portion, in which the first edge portion is curved toward an inside of the top sheet portion in a plan view with respect to the top sheet portion, and when a distance from the first edge portion to the second edge portion of the structural (Continued)

member is referred to as a structural member width, the closed cross-sectional portion forms a closed cross section on a vertical cut plane of the structural member along a direction of the structural member width, the vertical cut plane of the structural member along the direction of the structural member width has an open cross section, and a shape of the vertical cut plane of the structural member including the closed cross-sectional portion is asymmetric with respect to a center of a length of the structural member width.

17 Claims, 15 Drawing Sheets

(52) U.S. Cl.
CPC .. *B60G 2206/012* (2013.01); *B60G 2206/122* (2013.01); *B60G 2206/8201* (2013.01)

(58) Field of Classification Search
CPC .... B60G 2206/722; B60G 7/00; B23K 31/02; B23K 2101/006; B23K 9/16; B23K 9/23; B23K 9/02; B23K 2103/15; B23K 2103/42; B23K 2103/16; B23K 2103/04; B23K 2103/10
See application file for complete search history.

(56) References Cited

U.S. PATENT DOCUMENTS

| 2012/0038126 | A1* | 2/2012 | Monchiero | B60G 7/001 |
| | | | | 280/124.131 |
| 2015/0283595 | A1* | 10/2015 | Haselhorst | B21D 53/88 |
| | | | | 156/196 |
| 2016/0107494 | A1 | 4/2016 | Narita | |
| 2018/0009050 | A1* | 1/2018 | Tokita | B23K 9/0026 |
| 2018/0016657 | A1* | 1/2018 | Kizu | C21D 8/0226 |

FOREIGN PATENT DOCUMENTS

| JP | 8-318722 | A | 12/1996 |
| JP | 9-169204 | A | 6/1997 |
| JP | 9-315123 | A | 12/1997 |
| JP | 10-264624 | A | 10/1998 |
| JP | 2001-214954 | A | 8/2001 |
| JP | 2004-322707 | A | 11/2004 |
| JP | 3725031 | B2 | 12/2005 |
| JP | 2008-531358 | A | 8/2008 |
| JP | 2016-124320 | A | 7/2016 |
| WO | WO 2014/148513 | A1 | 9/2014 |

OTHER PUBLICATIONS

Written Opinion of the International Searching Authority for PCT/JP2018/043549 (PCT/ISA/237) dated Feb. 26, 2019.

* cited by examiner

FIG. 13

| STRUCTURAL MEMBER SHAPE | CLOSED CROSS SECTION | OPEN CROSS SECTION | |
|---|---|---|---|
| | | CLOSED CROSS-SECTIONAL PORTION IS NOT PRESENT | CLOSED CROSS-SECTIONAL PORTION IS PRESENT |
| BEFORE DEFORMATION | (OUTSIDE OF CURVE) (INSIDE OF CURVE) | (OUTSIDE OF CURVE) (INSIDE OF CURVE) | (OUTSIDE OF CURVE) (INSIDE OF CURVE) |
| AFTER DEFORMATION | (OUTSIDE OF CURVE) (INSIDE OF CURVE) | (OUTSIDE OF CURVE) (INSIDE OF CURVE) | (OUTSIDE OF CURVE) (INSIDE OF CURVE) |

# STRUCTURAL MEMBER

TECHNICAL FIELD OF THE INVENTION

The present invention relates to a structural member, and more particularly to a vehicle structural member.

RELATED ART

A suspension part which is a vehicle structural member is an important part which affects steering stability of a vehicle. For example, a front lower arm (hereinafter, also referred to as a "lower arm") maintains a position and orientation of a tire, maintains a lateral force when a vehicle turns, blocks transmission of an impact to a body when the impact is input, maintains strength when a vehicle is parked on a curb, or the like. Various studies have been made to realize high performance in the above-described roles.

For example, Patent Document 1 relates to a technique for blocking transmission of an impact to a body side when the impact is input and discloses an impact absorbing structure of a lower arm for a vehicle in which a hollow substantially rectangular closed cross-sectional portion is formed by an upper member and a lower member, a cross-sectional area of a rear upper corner portion is reduced, and a cross-sectional area of a rear lower corner portion increases. According to this configuration, an input of a collision load from a wheel is absorbed without securing a deformation allowance on a suspension member side.

Patent Document 2 discloses a suspension arm, in which a substantially triangular hollow suspension arm main body is formed by connecting three support portions to each other by a main frame, and a plurality of subframes are configured to be arranged along a main stress direction in a hollow portion of the suspension arm main body. According to this configuration, weight can be reduced while securing sufficient strength against stress transmitted from a suspension.

Patent Document 3 discloses a suspension arm for a vehicle, which includes a first horizontal portion which extends in a substantially horizontal direction in a state of being attached to a vehicle body, a vertical portion which has a peripheral edge of the first horizontal portion bent downward, a reverse flange which has a lower edge of the vertical portion bent inward, and a second horizontal portion which protrudes upward from the first horizontal portion, and is formed by pressing a metal sheet. By providing the second horizontal portion protruding upward from the first horizontal portion, a height of a bending center with respect to a bending load in an up-down direction increases, and the distance from the bending center to the reverse flange increases. Accordingly, a tensile load and a compressive load acting on the reverse flange are reduced.

Patent Document 4 discloses a suspension arm for a vehicle which includes a sheet-shaped main body portion which is disposed substantially parallel to an input surface of a load and a substantially pipe-shaped reinforcing portion which is continuously provided along at least one edge of the main body portion. According to this configuration, a bending rigidity of the suspension arm increases, and a sufficient rigidity to withstand a large load input due to unevenness of a road surface, turning of the vehicle, braking of wheels, or the like is secured.

Patent Document 5 relates to a suspension arm which is formed into an open cross-sectional shape by press forming one sheet material and discloses a configuration in which an inner terminal portion and an outer terminal portion of a first arm portion, and an inner terminal portion and outer terminal portion of a second arm portion are bent in a direction approaching each other. According to this configuration, a sufficient rigidity is secured without increasing weight.

Patent Document 6 discloses a suspension arm made of a metal sheet, in which a reinforcing portion formed into a pipe shape by folding an end portion of the metal sheet is provided in at least a portion of a side forming an outer periphery of the metal sheet, and the end portion of the metal sheet is wound inside the reinforcing portion and overlapped with the metal sheet. Since the reinforcing portion has a double-sheet winding portion, compared to a case where the end portion of the metal sheet is simply folded to form a reinforcing portion having no winding portion, a high rigidity can be sufficiently realized without welding.

PRIOR ART DOCUMENT

Patent Document

[Patent Document 1] Japanese Unexamined Patent Application, First Publication No. 2016-124320
[Patent Document 2] Japanese Unexamined Patent Application, First Publication No. H9-315123
[Patent Document 3] Japanese Patent No. 3725031
[Patent Document 4] Japanese Unexamined Patent Application, First Publication No. H8-188022
[Patent Document 5] Japanese Unexamined Patent Application, First Publication No. H8-318722
[Patent Document 6] Japanese Unexamined Patent Application, First Publication No. H10-264624

DISCLOSURE OF THE INVENTION

Problems to be Solved by the Invention

In recent years, there is an increasing demand for weight reduction of a vehicle body, and a vehicle structural member is required not only to fulfill a role thereof but also to achieve the weight reduction of the vehicle body. However, these are generally contradictory. For example, in the case of a structural member having a curved shape such as a lower arm of a suspension part, if a sheet thickness of the structural member is reduced to reduce weight of a vehicle body, out-of-plane deformation easily occurs. If the out-of-plane deformation occurs, a vehicle body bending strength in a front-rear direction (hereinafter, also referred to as a "front-rear bending strength") for maintaining the positional relationship between a tire and a body is insufficient. If the front-rear bending strength is insufficient, it is not possible to resist a force generated by a wheel when the vehicle body is parked on a curb, and the positional relationship between the tire and the body is broken.

Various studies have been made on a suspension part having a curved shape as described in Patent Documents 1 to 6 in order to maintain the role required of the part. However, almost no study has been made on the front-rear bending strength. This is because, in the related art in which the sheet thickness of the vehicle structural member can be made sufficiently large, the out-of-plane deformation hardly occurs, and it is not necessary to consider the influence.

However, in recent years, the out-of-plane deformation of the structural member easily occurs due to thinning of a steel sheet according to the weight reduction of the vehicle body. Further, for example, compared to the structural member having a closed cross section as in Patent Document 1, in the structural member having an open cross section when cut along a line connecting the inside and outside of a curved shape as in Patent Document 3, weight of a part can be reduced. However, in the structural member having the open cross section, when compressive stress locally increases on the inside of the curved shape, particularly, in a curved portion, the out-of-plane deformation easily occurs.

Further, from the viewpoint of the weight reduction of the vehicle body and improvement on collision safety, a high strength steel sheet is used as a material of the structural member. However, as the strength of the material increases, an elastic range is lengthened, and the out-of-plane deformation easily occurs.

Therefore, the present invention is made in consideration of the above-described problems, and an object of the present invention is to provide a new and improved vehicle structural member capable of reducing weight of the structural member and suppressing the out-of-plane deformation in the structural member having a curved shape.

Means for Solving the Problem

According to an aspect of the present invention, a structural member is provided including: a top sheet portion which has a first edge portion and a second edge portion facing the first edge portion; a wall portion which extends from the second edge portion in a direction intersecting the top sheet portion; and a closed cross-sectional portion which is provided in the first edge portion, in which the first edge portion is curved toward an inside of the top sheet portion in a plan view with respect to the top sheet portion, and when a distance from the first edge portion to the second edge portion of the structural member is referred to as a structural member width, the closed cross-sectional portion forms a closed cross section on a vertical cut plane of the structural member along a direction of the structural member width, the vertical cut plane of the structural member along the direction of the structural member width has an open cross section, and a shape of the vertical cut plane of the structural member including the closed cross-sectional portion is asymmetric with respect to a center of a length of the structural member width.

The structural member may have a first region on a side of the first edge portion from the center of the length of the structural member width and a second region on a side of the second edge portion from the center of the structural member width, in the vertical cut plane, and in the vertical cut plane including the closed cross-sectional portion, a cross-sectional area ratio $S_{in}/S_{out}$ of a cross-sectional area $S_{in}$ of the first region to a cross-sectional area $S_{out}$ of the second region may satisfy the following relational expression.

$$1.15 \leq S_{in}/S_{out} \leq 2.65$$

The top sheet portion, the wall portion, and the closed cross-sectional portion of the structural member may be formed of one member.

Further, the closed cross-sectional portion of the structural member may be formed of one member different from a member forming the top sheet portion.

The closed cross-sectional portion may be provided adjacent to the top sheet portion.

Alternatively, the closed cross-sectional portion may be formed of a plurality of members.

The structural member may be formed of a first member which forms the top sheet portion, the wall portion, and a portion of the closed cross-sectional portion and a second member which forms the closed cross-sectional portion together with the first member, in which both ends of the second member may be welded to the first member.

In the vertical cut plane, when a longest length in the direction of the structural member width in the closed cross-sectional portion is denoted by a and a longest length in a direction perpendicular to the direction of the structural member width in the closed cross-sectional portion is denoted by β, α/β may satisfy the following relational expression, $$3/7 \leq \alpha/\beta \leq 7/3.$$

A cross-sectional shape of the closed cross-sectional portion may be rectangular.

The closed cross-sectional portion may be formed of a hollow member.

A hollow portion of the closed cross-sectional portion may be filled with a resin filler.

The closed cross-sectional portion may be formed of a solid member

The structural member may be a structural member of a vehicle.

Alternatively, the structural member may be a suspension part of a vehicle.

The structural member may have a tensile strength of 780 MPa or more.

A sheet thickness of the structural member may be 2.9 mm or less.

An arm length of the structural member may be 350 mm or more.

The structural member width of the structural member may be 70 mm or more.

Effects of the Invention

As described above, according to the present invention, in a structural member having a curved shape, the weight of the structural member can be reduced and out-of-plane deformation can be suppressed.

BRIEF DESCRIPTION OF THE DRAWINGS

FIG. 13 is an explanatory view schematically illustrating likelihood of an out-of-plane deformation occurring when a cross section in the structural member width direction is a closed cross section and an open cross section.

EMBODIMENTS OF THE INVENTION

Figure 1:
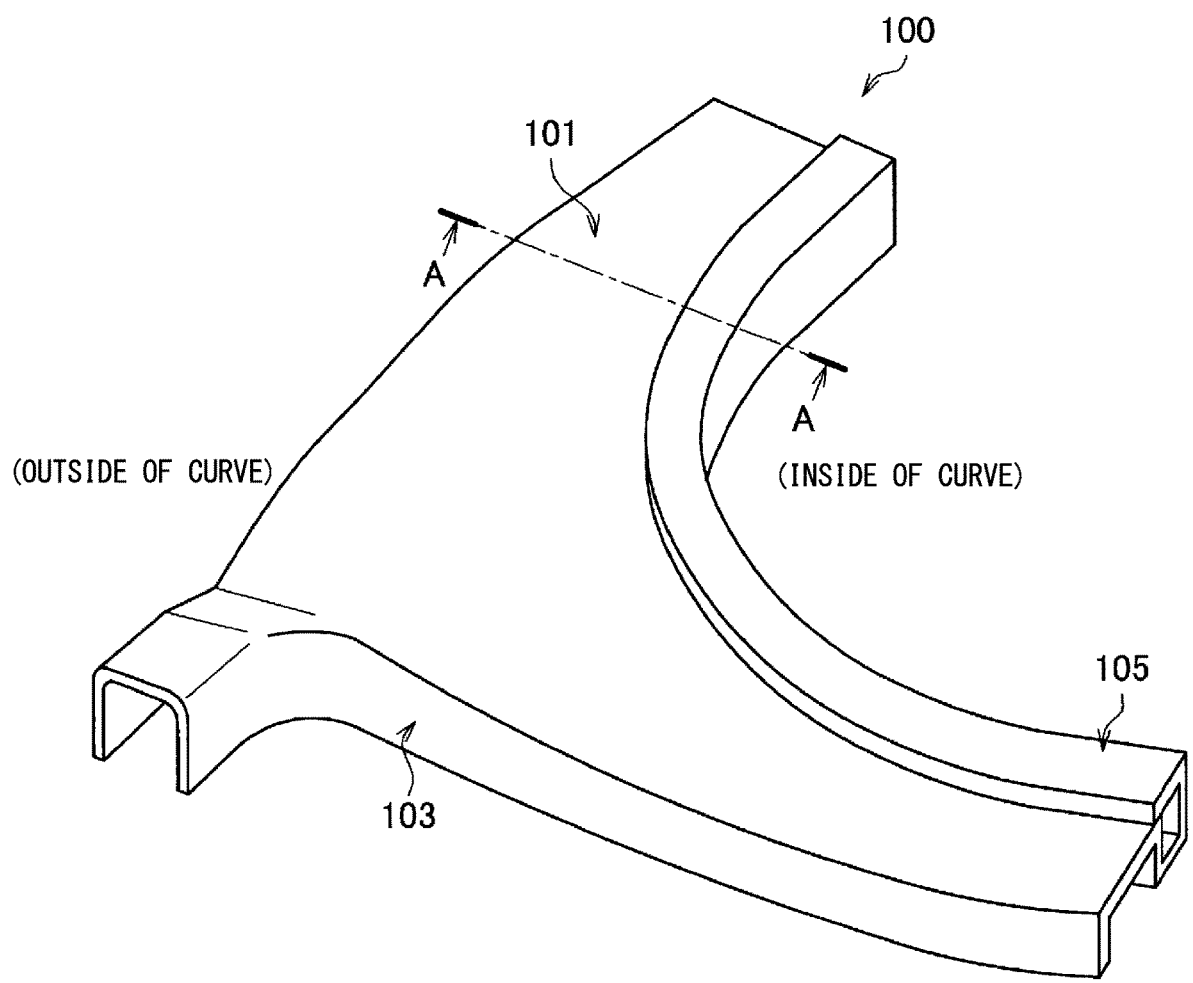
FIG. 1 is a perspective view illustrating an outline of a shape of a vehicle structural member according to an embodiment of the present invention.

Hereinafter, preferred embodiments of the present invention will be described in detail with reference to the accompanying drawings. In the specification and the drawings, components having substantially the same functional configuration are denoted by the same reference numerals, and repeated descriptions are omitted.

<1. Vehicle Structural Member>

First, a vehicle structural member according to an embodiment of the present invention will be described with reference to FIGS. 1 to 6. FIG. 1 is a perspective view illustrating an outline of a shape of the vehicle structural member according to the present embodiment. FIGS. 2 to 6 are schematic views of a cut plane taken along a cutting-plane line A-A in FIG. 1 and illustrate a configuration example of the vehicle structural member.

1-1. Overall Configuration

A vehicle structural member 100 according to the present embodiment has a curved shape as illustrated in FIG. 1. For example, an example of the structural member 100 is a chassis part. For example, as the chassis part, there is an arm or link part of a suspension part, and specifically, there is a lower arm, a front upper arm, a rear upper arm, a trailing arm, or the like. The shape of the structural member 100 according to the present embodiment is not limited to the suspension part, but can be applied to a body part. Specifically, as a vehicle skeleton of the body part, there is a roof side rail, a B pillar, an A pillar lower, an A pillar upper, a kick clean force, or the like. Further, as an impact absorbing skeleton of the body part, there is a rear side member, a front side member, or the like. In particular, by applying the shape of the structural member 100 according to the present embodiment to a part having a curved shape which is thick and has a small cross-sectional size compared to a general body part, weight reduction of the part and suppression of the out-of-plane deformation can be effectively realized.

The structural member 100 has a top sheet portion 101, a wall portion 103 extending in a direction intersecting the top sheet portion 101, and a closed cross-sectional portion 105. In particular, the structural member 100 includes the top sheet portion 101 having a curved shape, the wall portion 103 which is provided along an outside of a curve of the top sheet portion 101, and the closed cross-sectional portion 105 which is provided in at least a portion of an inside of the curve of the top sheet portion 101. Moreover, in the structural member 100, a side having a larger radius of curvature of the curved shape is referred to as the outside of the curve, and a side having a smaller radius of curvature of the curved shape is referred to as the inside of the curve.

The top sheet portion 101 is a surface having a first edge portion 101a and a second edge portion 101b facing the first edge portion 101a. The first edge portion 101a is curved toward the inside of the top sheet portion 101 in a plan view with respect to the top sheet portion 101. In particular, the top sheet portion 101 is a surface which is curved in one direction in a plane orthogonal to a sheet thickness direction of a steel sheet forming the top sheet portion 101. That is, the top sheet portion 101 has a curved shape in a plan view with respect to the top sheet portion 101. A surface shape of the top sheet portion 101 need not be flat, and may have unevenness as illustrated in FIG. 1. Further, a through-hole (not illustrated) or the like may be formed in the surface of the top sheet portion 101.

The wall portion 103 is a surface which is formed so as to extend in a direction intersecting the top sheet portion 101 from an edge portion on the second edge portion 101b side (the outside of the curve) of the top sheet portion 101. For example, the wall portion 103 is formed to extend in a direction substantially orthogonal to the top sheet portion 101.

The closed cross-sectional portion 105 is provided on the first edge portion 101a side (the inside of the curve) of the top sheet portion 101 and is provided with respect to the top sheet portion 101 to form an open cross section together with the top sheet portion 101 and the wall portion 103. The closed cross-sectional portion 105 forms a closed cross section by one or a plurality of members. Further, the closed cross-sectional portion 105 may form the closed cross section alone, or the closed cross-sectional portion 105 may form the closed cross section together with the top sheet portion 101.

The closed cross-sectional portion 105 may be provided adjacent to the top sheet portion 101. Here, the closed cross-sectional portion 105 being adjacent to the top sheet portion 101 indicates a state in which a portion forming the closed cross-sectional portion 105 is directly or indirectly connected to the top sheet portion 101.

Specifically, the closed cross-sectional portion 105 being directly adjacent to the top sheet portion 101 indicates a state where the closed cross-sectional portion 105 is directly attached to a lower surface 101d of the top sheet portion 101 as in configuration examples D and D' of FIGS. 5 and 6 described later. Moreover, the closed cross-sectional portion 105 being directly adjacent to the top sheet portion 101 includes a state where the closed cross-sectional portion 105 is attached to an end surface on the inside of the curve of the top sheet portion 101. Alternatively, the closed cross-sectional portion 105 being directly adjacent to the top sheet portion 101 includes a state where a portion or the whole of the closed cross-sectional portion 105 is formed using a member for forming the top sheet portion 101 and the top sheet portion 101 and the closed cross-sectional portion 105 are continuous to each other as in configuration examples A to C in FIGS. 2 to 4 described later.

Further, the closed cross-sectional portion 105 being indirectly adjacent to the top sheet portion 101 indicates a state where a member is provided between the closed cross-sectional portion 105 and the top sheet portion 101 and the closed cross-sectional portion 105 and the top sheet portion 101 are connected to each other via the member.

The closed cross-sectional portion 105 may be provided in a manner that a reinforcing effect can be exerted inside the curve of the structural member 100, and a portion of the closed cross-sectional portion 105 may be located above an upper surface 101c of the top sheet portion 101.

When the structural member 100 is cut along a straight line which is orthogonal to a neutral line of the top sheet portion 101 and connects the outside of the curve and the inside of the curve to each other (that is, when cut along the cutting-plane line A-A in FIG. 1), the cross section (vertical cut plane) is an open cross section in which a lower surface side of the top sheet portion 101 is open. In the cross section, the closed cross-sectional portion 105 of the structural member 100 is closed. That is, the structural member 100 has an open cross-sectional shape as a whole, but has a portion having a closed cross section inside the curve. As described above, the structural member 100 according to the present embodiment has the closed cross-sectional portion 105 provided only on the inside of the curve. Accordingly, the inside of the curve is reinforced while an increase in weight of the structural member 100 is suppressed, and the front-rear bending strength increases. Further, since the closed cross-sectional portion 105 is provided adjacent to the top sheet portion 101, an effect of reinforcing the inside of the curve is further improved by the closed cross-sectional portion 105. A more detailed description of a geometric shape of the structural member 100 will be described later.

Here, the open cross section of the vertical cut plane of the structural member 100 means an open cross section integrally formed by the top sheet portion 101, the wall portion 103, and the closed cross-sectional portion 105. That is, although the vertical cut plane partially includes the closed cross section formed by the closed cross-sectional portion 105, the structural member 100 is open on the lower surface side of the top sheet portion 101 as a whole. Accordingly, the vertical cut plane has the open cross section.

1-2. Configuration Example

FIGS. 2 to 6 illustrate specific configuration examples of the structural member 100.

Configuration Example A

Figure 2:
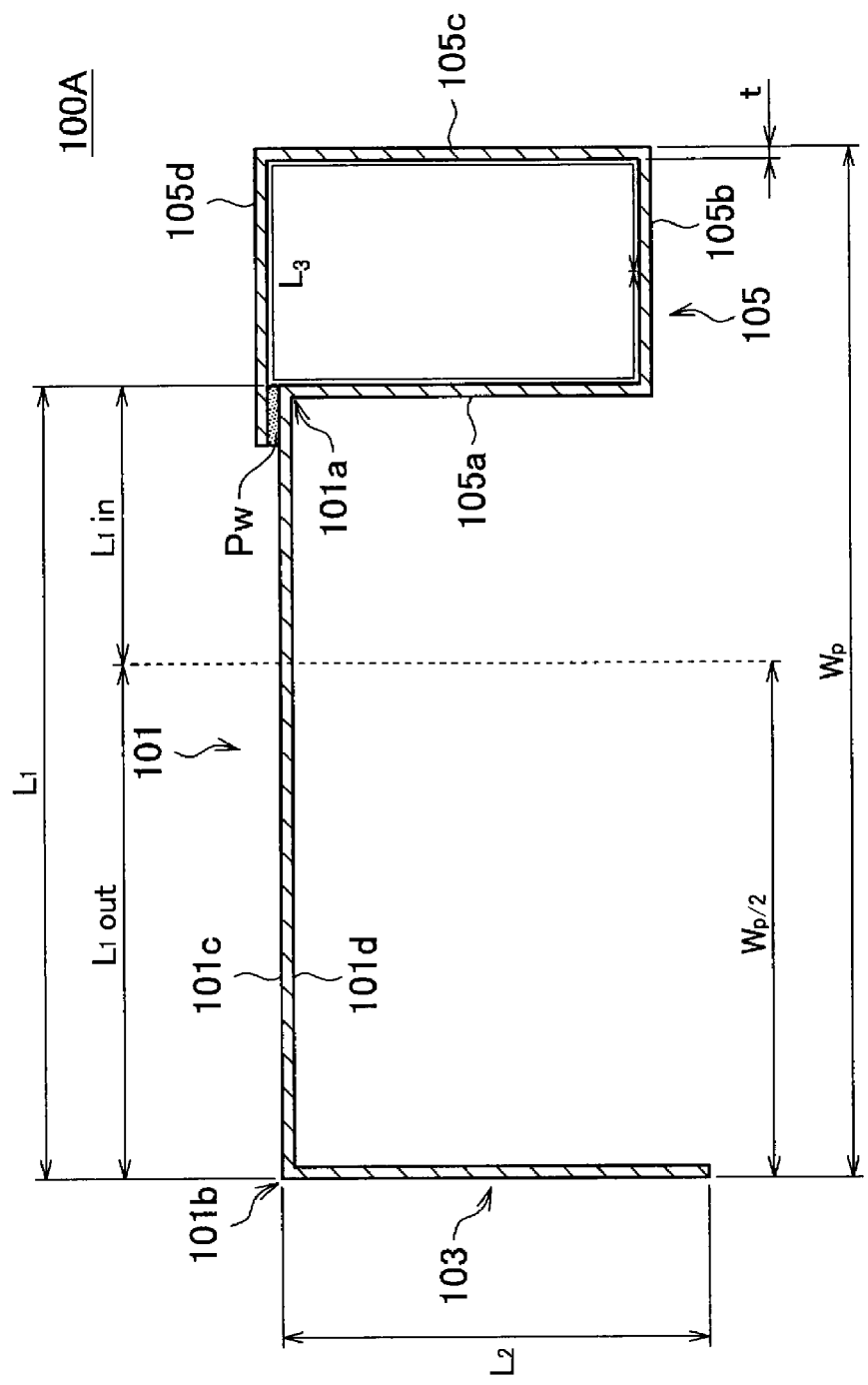
FIG. 2 is a schematic view of a cut plane taken along a cutting-plane line A-A in FIG. 1 and illustrates one configuration example of the vehicle structural member.

A structural member 100A illustrated in FIG. 2 has the top sheet portion 101, the wall portion 103, and the closed cross-sectional portion 105 formed from one steel sheet. The wall portion 103 extends to the lower surface 101d side of the top sheet portion 101 from one end side which is an edge portion on the outside of the curve of the top sheet portion 101. That is, the wall portion 103 extends in a sheet thickness direction (a direction from the upper surface 101c side to the lower surface 101d side of the top sheet portion 101) of the top sheet portion 101 by bending the top sheet portion 101. The closed cross-sectional portion 105 is formed to protrude toward the lower surface 101d of the top sheet portion 101 on the other end side which is an edge portion on the inside of the curve of the top sheet portion 101. For example, the closed cross-sectional portion 105 is a rectangular closed portion constituted by four surfaces 105a to 105d formed by bending a steel sheet. In this case, the surface 105d including an end portion of the steel sheet is welded and fixed to the upper surface 101c of the top sheet portion 101. The surface 105d and the upper surface 101c of the top sheet portion 101 are welded to each other. Accordingly, a weld Pw is provided and an internal space of the closed cross-sectional portion 105 is completely closed.

Configuration Example B

Figure 3:
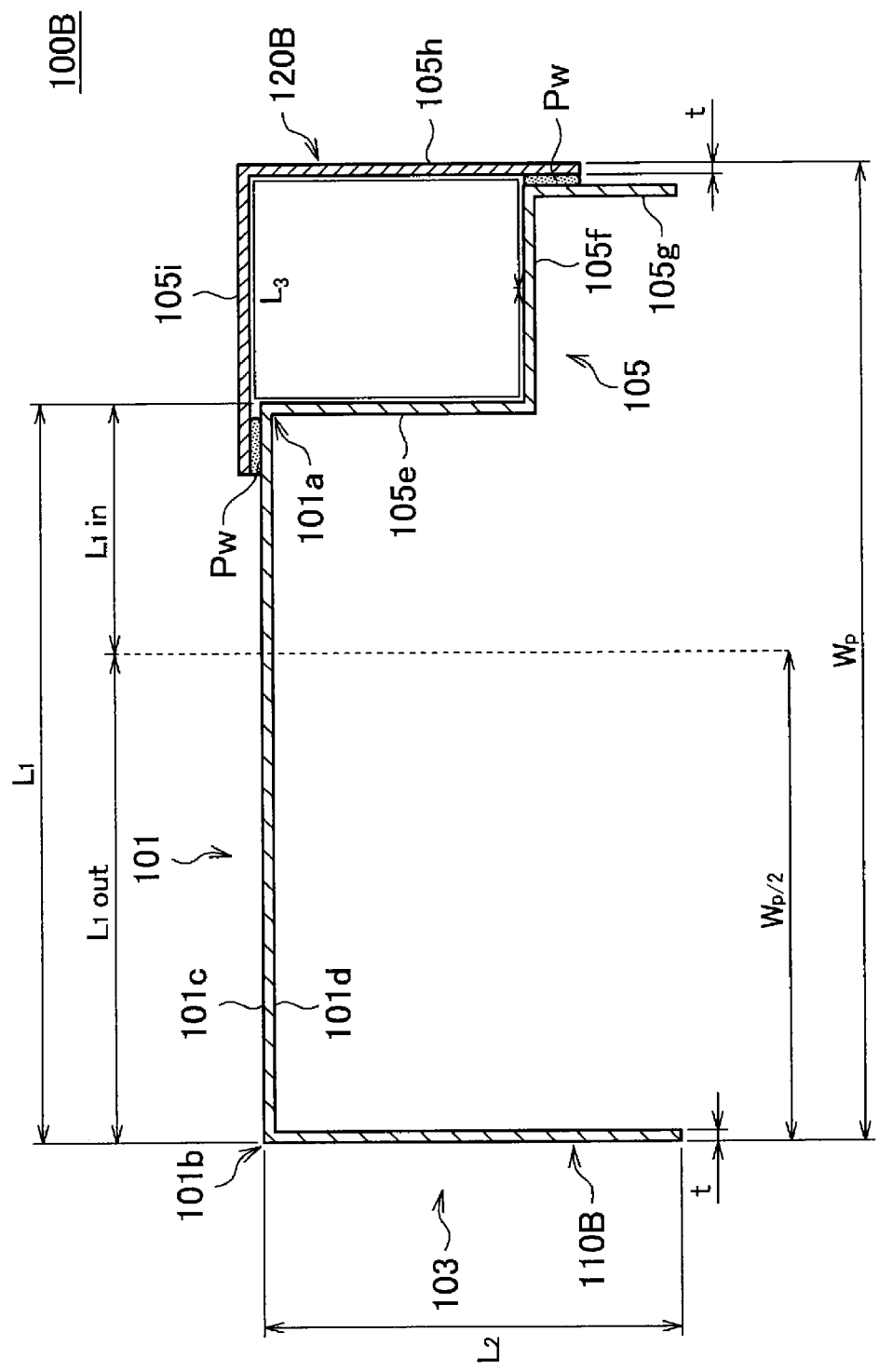
FIG. 3 is a schematic view of a cut plane taken along the cutting-plane line A-A in FIG. 1 and illustrates another configuration example of the vehicle structural member.

A structural member 100B illustrated in FIG. 3 is formed of two steel sheets. Specifically, the top sheet portion 101, the wall portion 103, and a portion of the closed cross-sectional portion 105 are formed by a first steel sheet 110B which is a first member, and a portion of the closed cross-sectional portion 105 is formed by the second steel sheet 120B which is a second member. Similar to the configuration example A of FIG. 2, the wall portion 103 is formed by bending the first steel sheet 110B so that the first steel sheet 110B extends from one end side, which is the edge portion on the outside of the curve of the top sheet portion 101, to the lower surface 101d side of the top sheet portion 101. Meanwhile, the first steel sheet 110B is bent to form two surfaces, that is, a surface 105e and a surface 105f, on the other end side which is the edge portion on the inside of the curve of the top sheet portion 101. The surface 105e is a surface which extends to the lower surface 101d side of the top sheet portion 101. The surface 105f is a surface which extends from the surface 105e to a side (that is, the inside of the curve) opposite to the wall portion 103. Further, a side (that is, the inside of the curve) of the surface 105f opposite to the wall portion 103 is bent toward an outside (the side opposite to the top sheet portion 101) of a bent portion between the surface 105e and the surface 105f to form a welding surface 105g.

In addition, the second steel sheet 120B is bent along the edge portion on the inside of the curve of the top sheet portion 101 of the structural member 100B. Accordingly, two surfaces 105h and 105i constituting the closed cross-sectional portion 105 are formed. In this manner, in the second steel sheet 120B having an L-shaped cross section, an end portion of the surface 105h is welded to the welding surface 105g and an end portion of the surface 105i is welded to the upper surface 101c of the top sheet portion 101. That is, both ends of the second steel sheet 120B are welded to the first steel sheet 110B. Accordingly, the closed cross-sectional portion 105 of the structural member 100B is formed by the four surfaces 105e, 105f, 105h, and 105i.

Configuration Example C

Figure 4:
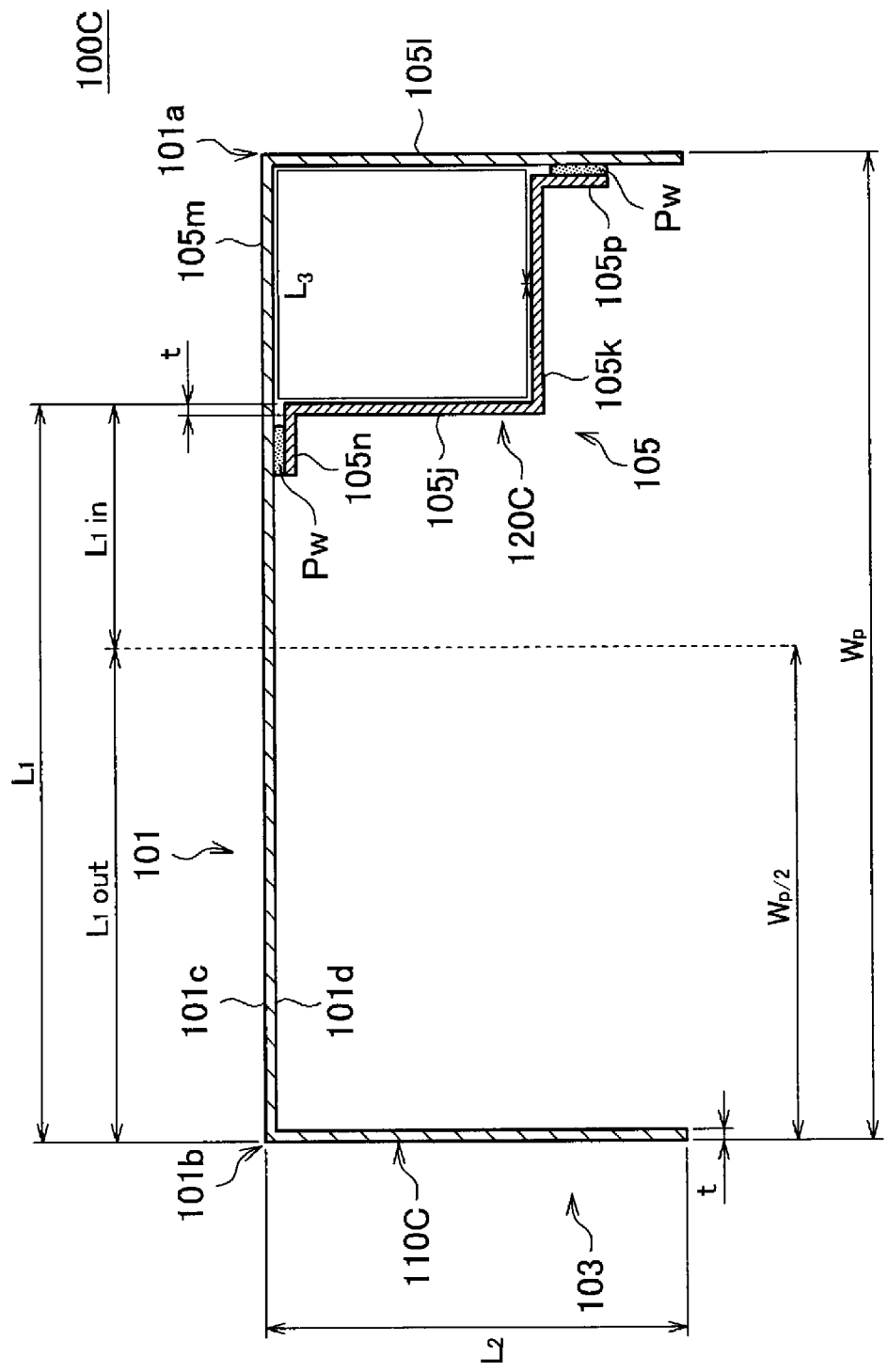
FIG. 4 is a schematic view of a cut plane taken along the cutting-plane line A-A in FIG. 1 and illustrates still another configuration example of the vehicle structural member.

A structural member 100C illustrated in FIG. 4 is formed of two steel sheets. Specifically, the top sheet portion 101, the wall portion 103, and a portion of the closed cross-sectional portion 105 are formed by a first steel sheet 110C which is a first member, and a portion of the closed cross-sectional portion 105 is formed by the second steel sheet 120C which is a second member. Similar to the configuration example A of FIG. 2, the wall portion 103 is formed by bending the first steel sheet 110C so that the first steel sheet 110C extends from one end side, which is the edge portion on the outside of the curve of the top sheet portion 101, to the lower surface 101d side of the top sheet portion 101. The first steel sheet 110C is bent to form a surface 105l extending to the lower surface 101d side of the top sheet portion 101, on the other end side which is the edge portion on the inside of the curve of the top sheet portion 101.

In addition, the second steel sheet 120C is bent along an edge portion on the inside of the curve of the top sheet portion 101 of the structural member 100C. Thereby, two surfaces 105j and 105k constituting the closed cross-sectional portion 105 are formed. Further, in the second steel sheet 120C having an L-shaped cross section, end portions of the surfaces 105j and 105k are bent outward in a bending direction of the second steel sheet 120C, and thus, welding surfaces 105n and 105p are formed. The welding surface 105n is welded to the lower surface 101d of the top sheet portion 101, and the welding surface 105p is welded to the surface 105l. That is, both ends of the second steel sheet 120C are welded to the first steel sheet 110C. Thereby, the closed cross-sectional portion 105 of the structural member 100C is formed by the four surfaces 105j, 105k, 105l, and 105m.

In the configuration examples B and C, both ends of the second steel sheets 120B and 120C are welded to the first steel sheets 110B and 110C to form the closed cross-sectional portion 105. By this relatively simple method, the closed cross-sectional portions 105 having various configurations are formed. Accordingly, various closed cross-sectional portions 105 are provided according to on strength and a shape required in the structural portion 100. Further, the first steel sheets 110B, 110C and the second steel sheets 120B, 120C are welded in a state of being in surface-contact with each other. Thereby, bonding strength can be further increased, and an effect of reinforcing the inside of the curve by the closed cross-sectional portion 105 is further improved.

Configuration Example D

Figure 5:
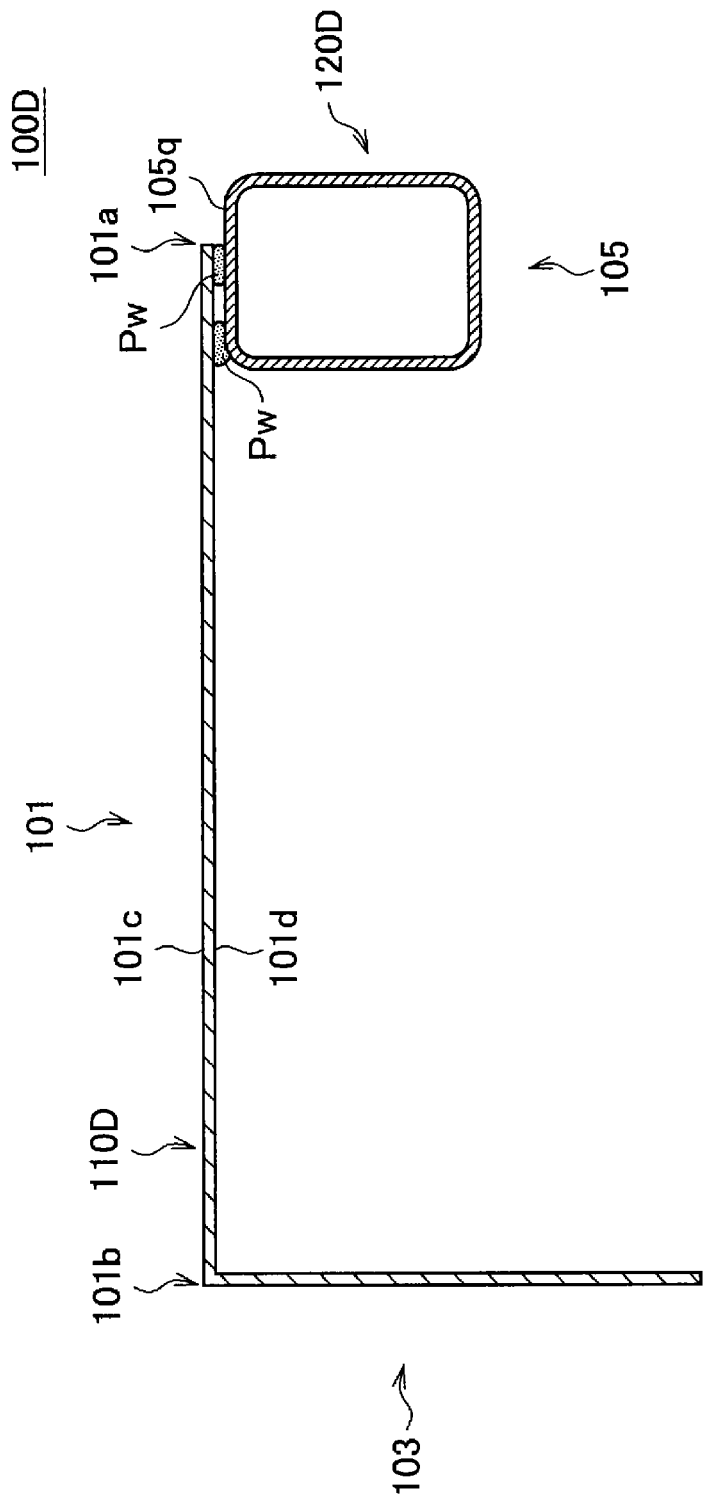
FIG. 5 is a schematic view of a cut plane taken along the cutting-plane line A-A in FIG. 1 and illustrates still another configuration example of the vehicle structural member.
Figure 6:
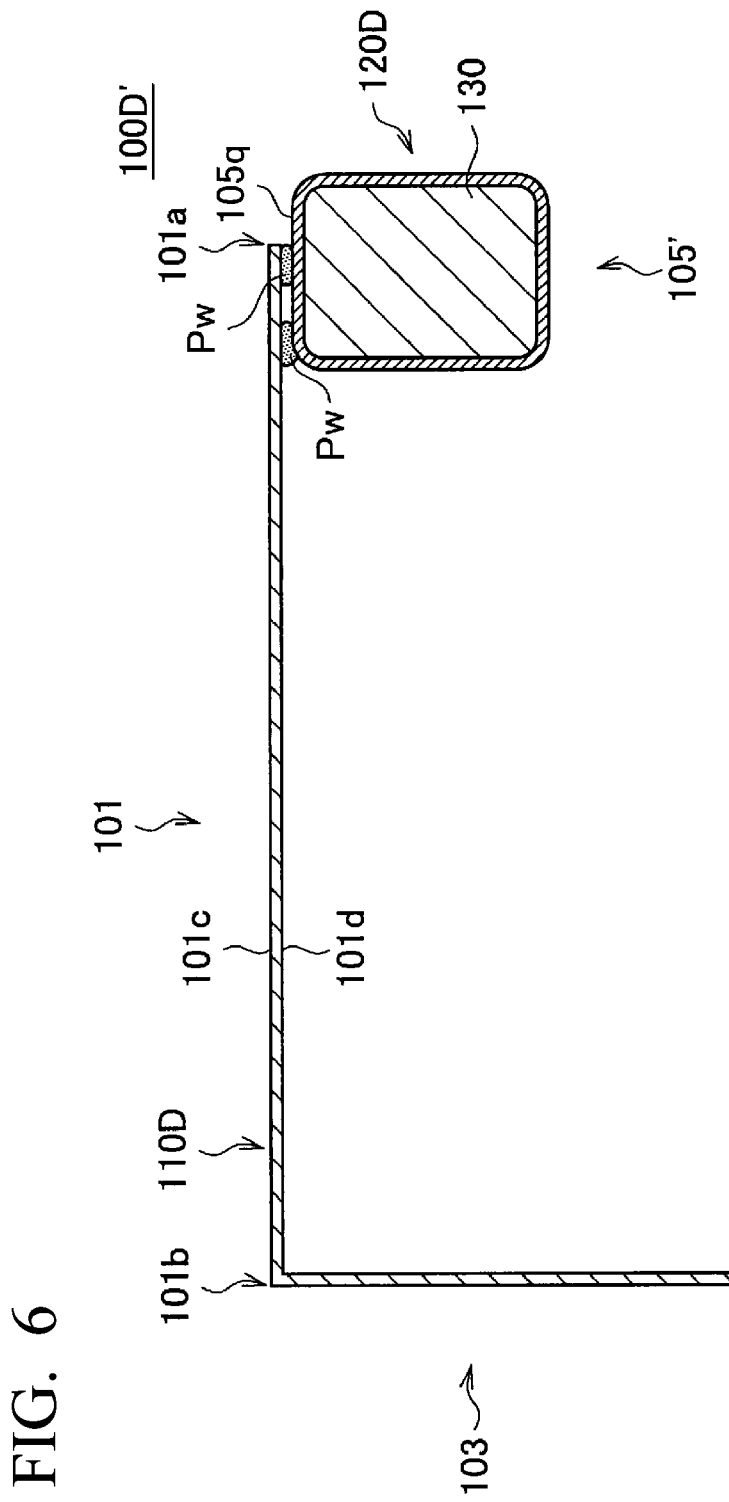
FIG. 6 is a schematic view of a cut plane taken along the cutting-plane line A-A in FIG. 1 and illustrates still another configuration example of the vehicle structural member.

A structural member 100D illustrated in FIG. 5 is also formed from two steel sheets. Specifically, the top sheet portion 101 and the wall portion 103 are formed by a first steel sheet 110D, and the closed cross-sectional portion 105 is formed by a second steel sheet 120D. That is, the first steel sheet 110D is bent along a line which is an edge portion on an outside of a curve of the top sheet portion 101 of the structural member 100D. Accordingly, the top sheet portion 101 and the wall portion 103 are formed. Further, for example, the closed cross-sectional portion 105 may be formed of a hollow member having a rectangular cross section. The closed cross-sectional portion 105 is fixed by welding an outer surface 105q to the lower surface 101d of the top sheet portion 101 near an edge portion on an inside of the curve of the top sheet portion 101. In this way, it is possible to form the structural member 100D having the closed cross-sectional portion 105 on the inside of the curve.

As a modification example of the structural member 100, for example, the closed cross-sectional portion 105 of the structural member 100 does not necessarily have to be hollow as illustrated in FIGS. 2 to 5 and the closed cross-sectional portion 105 may be solid. For example, FIG. 6 is a modification example of the structural member 100D illustrated in FIG. 5 and illustrates a structural member 100D' having a solid closed cross-sectional portion 105'. In the closed cross-sectional portion 105' of the structural member 100D', a hollow portion of the closed cross-sectional portion 105 in FIG. 5 is filled with a resin filler 130. Moreover, although weight of the closed cross-sectional portion 105' increases, the closed cross-sectional portion 105' may be formed by a solid prismatic member or the like. In this manner, even if the closed cross-sectional portion 105 is solid, it is possible to achieve a reinforcing function for increasing the front-rear bending strength. Similarly, in the configuration example A of FIG. 2, the configuration example B of FIG. 3, and the configuration example C of FIG. 4, the closed cross-sectional portion 105 may be solid.

Further, a cross-sectional shape of the closed cross-sectional portion 105 is not limited to a rectangle. For example, the cross-sectional shape of the closed cross-sectional portion 105 may be a polygon, a circle, an ellipse, or the like. That is, the shape is not particularly limited as long as a space closed by the closed cross-sectional portion 105 is formed. For example, the closed cross-sectional portion 105 can be realized by a square tube, a cylinder, or the like.

Figure 7:
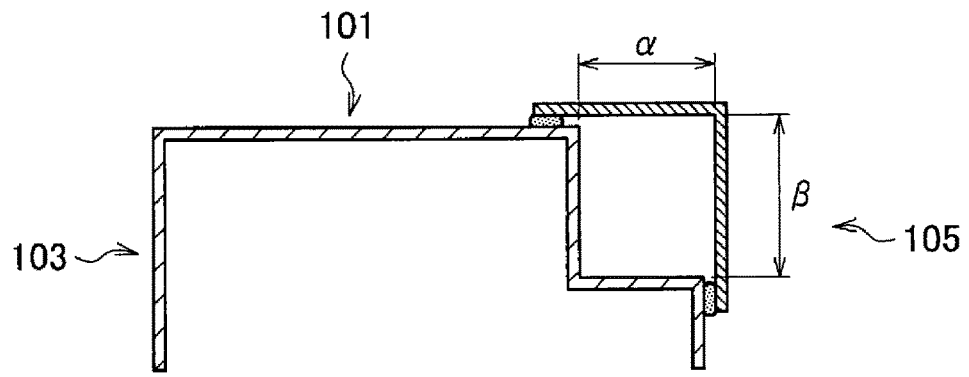
FIG. 7 is an explanatory view illustrating an example of an aspect ratio of a closed cross-sectional portion.

Further, as illustrated in FIG. 7, in the cross-sectional shape of the closed cross-sectional portion 105, when a longest length of the closed cross-sectional portion 105 in a structural member width direction (lateral direction) is denoted by a and a longest length of the closed cross-sectional portion 105 in a direction (vertical direction) perpendicular to the structural member width direction is denoted by $\beta$, $\alpha/\beta$ may satisfy a relational expression of $3/7 \leq \alpha/\beta \leq 7/3$. Similar to FIG. 3, FIG. 7 illustrates a vertical cut plane (that is, a cross section taken along the cutting-plane line A-A in FIG. 1) of the configuration example C. The aspect ratio $\alpha/\beta$ in the closed cross-sectional portion 105 has the above relationship. Accordingly, it is possible to suppress the cross-sectional shape of the closed cross-sectional portion 105 from becoming a vertically long or horizontally long flat shape and being equivalent to a flat surface. Thereby, the closed cross-sectional portion 105 can sufficiently exert the effect of reinforcing the inside of the curve in the structural member 100.

Furthermore, the aspect ratio $\alpha/\beta$ of the cross-sectional shape of the closed cross-sectional portion 105 may be set to be 2/3 to 3/2. Thereby, the closed cross-sectional portion 105 can further exert the effect of reinforcing the inside of the curve in the structural member 100.

Figure 8:
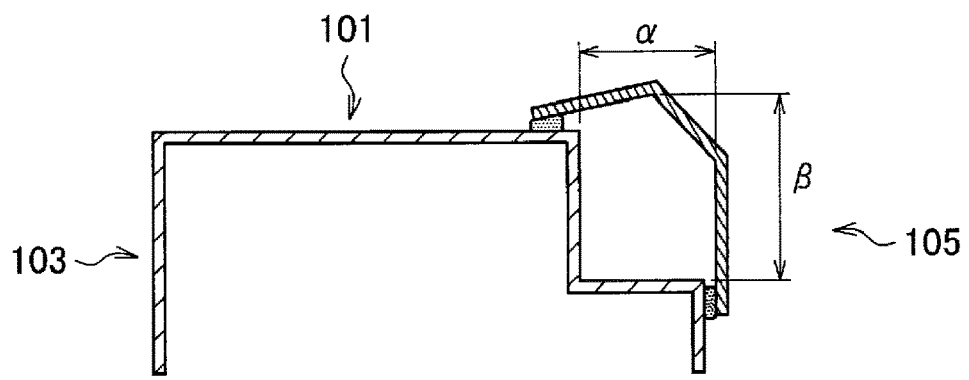
FIG. 8 is an explanatory view illustrating another example of the aspect ratio of the closed cross-sectional portion.

When the cross-sectional shape of the closed cross-sectional portion 105 is a polygon, as illustrated in FIG. 8, a longest length in a width direction (lateral direction) of the structural member 100 in the polygon may be denoted by $\alpha$, and a longest length of the closed cross-sectional portion 105 in a direction (vertical direction) perpendicular to the width direction may be denoted by $\beta$. Moreover, the same applies to a case where the cross-sectional shape of the closed cross-sectional portion 105 is a circle, an ellipse, or the like.

Figure 9:
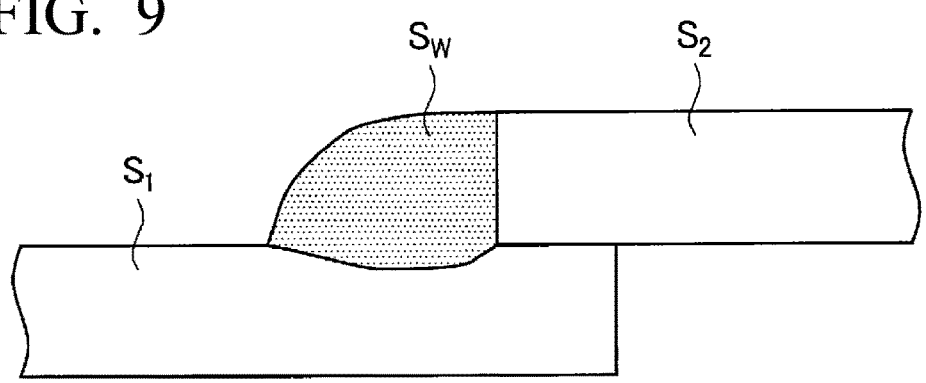
FIG. 9 is an explanatory view illustrating a weld of a steel sheet by arc welding.

Further, the structural members 100A to 100D' illustrated in FIGS. 2 to 6 and a weld Pw in FIG. 16 described later schematically illustrate a weld location. For example, actual welding is performed by arc welding. When arc welding is performed, for example, the weld Pw between the steel sheet $S_1$ and the steel sheet $S_2$ has a shape as illustrated in FIG. 9. Further, the welds of the configuration examples A to D' may be joint portions joined by a joining method other than welding.

In the present embodiment, a material of each member constituting the structural member 100 is not particularly limited. The top sheet portion 101, the wall portion 103, and the closed cross-sectional portion 105 constituting the structural member 100 according to the present embodiment may be formed of a metal material such as steel, an aluminum alloy, or a magnesium alloy, or a resin material such as glass fiber or carbon fiber. Further, the member may be formed of a composite material of a metal material and a resin material.

<2. Structural Member Shape>

As illustrated in FIGS. 2 to 6, in the vehicle structural member 100 according to the present embodiment, when the structural member 100 is cut along the straight line which is orthogonal to the neutral line of the top sheet portion 101 and connects the outside of the curve and the inside of the curve to each other, the cross section is the open cross section as a whole. However, there is the portion that becomes the closed cross section inside the curve. This shape is determined based on a relationship between the shape of the structural member 100 and occurrence of an out-of-plane deformation. Hereinafter, the configuration of the structural member 100 according to the present embodiment will be described in detail.

[2-1. Relationship with Out-of-Plane Deformation]

Figure 10:
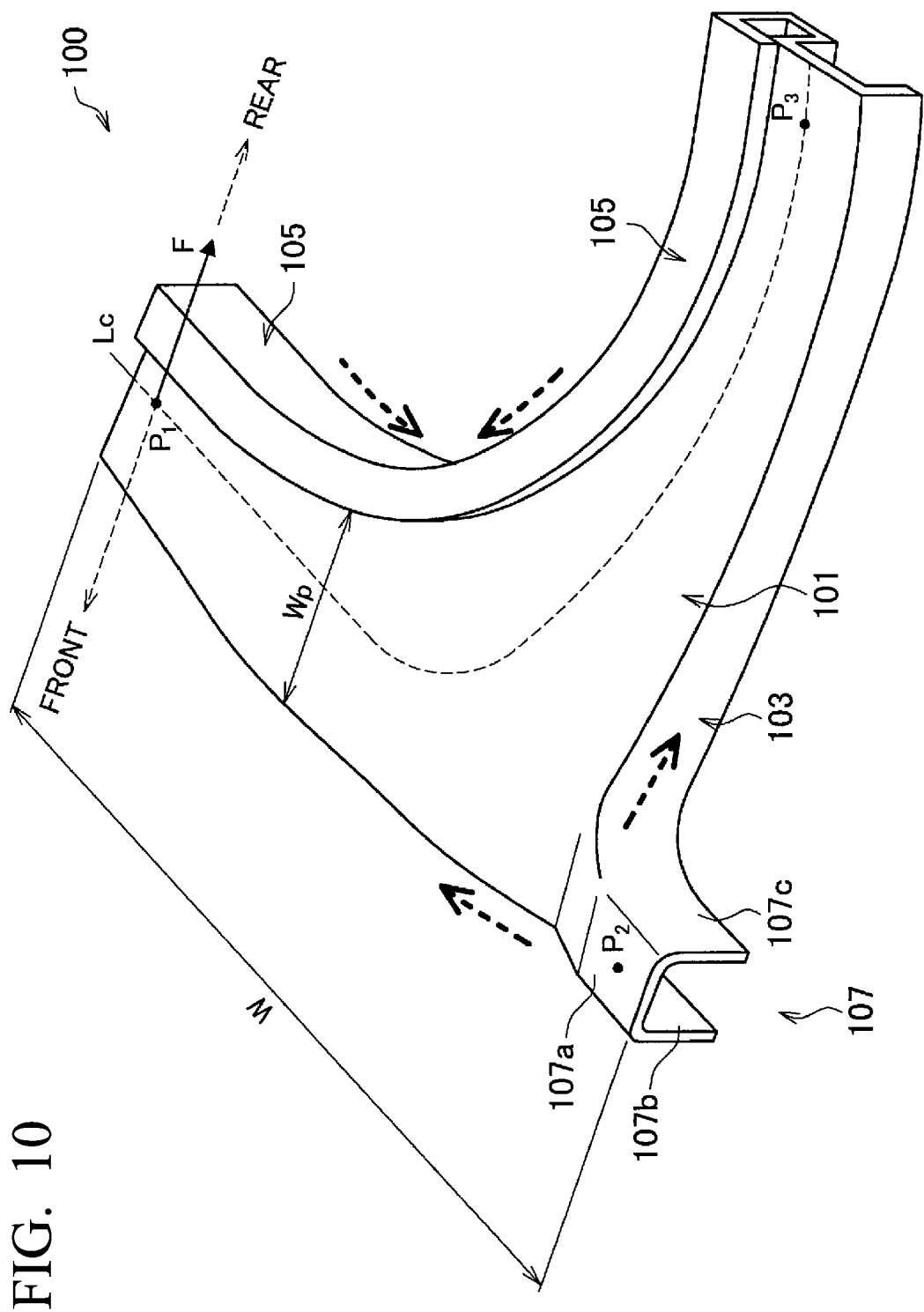
FIG. 10 is an explanatory view illustrating an arm length W and a structural member width Wp of a structural member having a curved shape according to the embodiment.

First, a relationship between the shape of the structural member 100 having the curved shape and the out-of-plane deformation will be described with reference to FIGS. 10 to 12. FIG. 10 is an explanatory view illustrating an arm length W and a structural member width Wp of the structural member 100 having the curved shape according to the present embodiment.

FIG. 10 illustrates a front lower arm which is an example of the structural member 100. The front lower arm is a suspension part for connecting a lower portion of a knuckle rotatably supporting a wheel to a vehicle body. A point $P_1$ on one end side of the curved top sheet portion 101 of the structural member 100 indicates a ball joint installation position for suspending the wheel. Moreover, a point $P_2$ of the curved portion of the top sheet portion 101 and a point $P_3$ on the other end side of the top sheet portion 101 are positions connected to the body part. For example, the structural member 100 is fixed to the body part via a bush joint provided at the points $P_2$ and $P_3$.

For example, a portion of the structural member 100 at the point $P_2$ is a vehicle body attachment portion 107. The vehicle body attachment portion 107 protrudes from the top sheet portion 101 and the wall portion 103 in a direction orthogonal to a front-rear direction of the vehicle body, on the outside of the curve of the structural member 100. The vehicle body attachment portion 107 has a substantially U-shaped cross section. The vehicle body attachment portion 107 has a top wall portion 107a extending from the top sheet portion 101 and a pair of standing wall portions 107b and 107c extending from the wall portion 103.

In the structural member 100, as illustrated in FIG. 10, the arm length W and the structural member width Wp are defined. The arm length W is a length of the structural member 100 in a direction orthogonal to the front-rear direction of the vehicle body. In other words, the arm length W is a length of the structural member 100 in a direction orthogonal to a direction in which a load is applied to the structural member 100 having the curved shape. The structural member width Wp is a distance from the inside of the curve to the outside of the curve of the structural member 100 in a direction orthogonal to a neutral line Lc of the top sheet portion 101.

As a result of a study with respect to the structural member 100, the present inventor obtained a finding that a rigidity of the top sheet portion 101 decreases as an area of the top sheet portion 101 of the structural member 100 increases. In other words, the out-of-plane deformation more easily occurs as the area of the top sheet portion 101 of the structural member 100 increases. As illustrated in FIG. 10, when a load F is applied in the front-rear direction of the vehicle body at the point $P_1$ of the structural member 100, in the structural member 100 having the curved shape, a compressive stress is generated from the point $P_1$ and the point $P_3$ toward the curved portion on the inside of the curve while a tensile stress is generated from the point $P_2$ toward the points $P_1$ and $P_3$ in the curved portion on the outside of the curve. The out-of-plane deformation occurs due to the compressive stress on the inside of the curve. In addition, as the area of the top sheet portion 101 increases, the structural member 100 is more easily out-of-plane deformed under the influence of the compressive stress generated inside the curve. In general, compared to a vehicle having smaller vehicle body weight, in a vehicle having larger vehicle body weight, the area of the top sheet portion 101 of the structural member 100 is large, and the out-of-plane deformation easily occurs.

If the out-of-plane deformation of the structural member 100 occurs, the front-rear bending strength is insufficient. The front-rear bending strength is evaluated based on a proportional limit strength. The proportional limit strength indicates whether or not permanent distortion occurs and is used as an index indicating an influence on alignment performance for maintaining a positional relationship between a tire and a body. Specifically, for example, as illustrated in FIG. 11, the proportional limit strength refers to strength at a limit point at which a relationship between the load F and a displacement (stroke) due to the load F is linearly maintained when the load F is applied to the point $P_1$ of the structural member 100.

Figure 11:
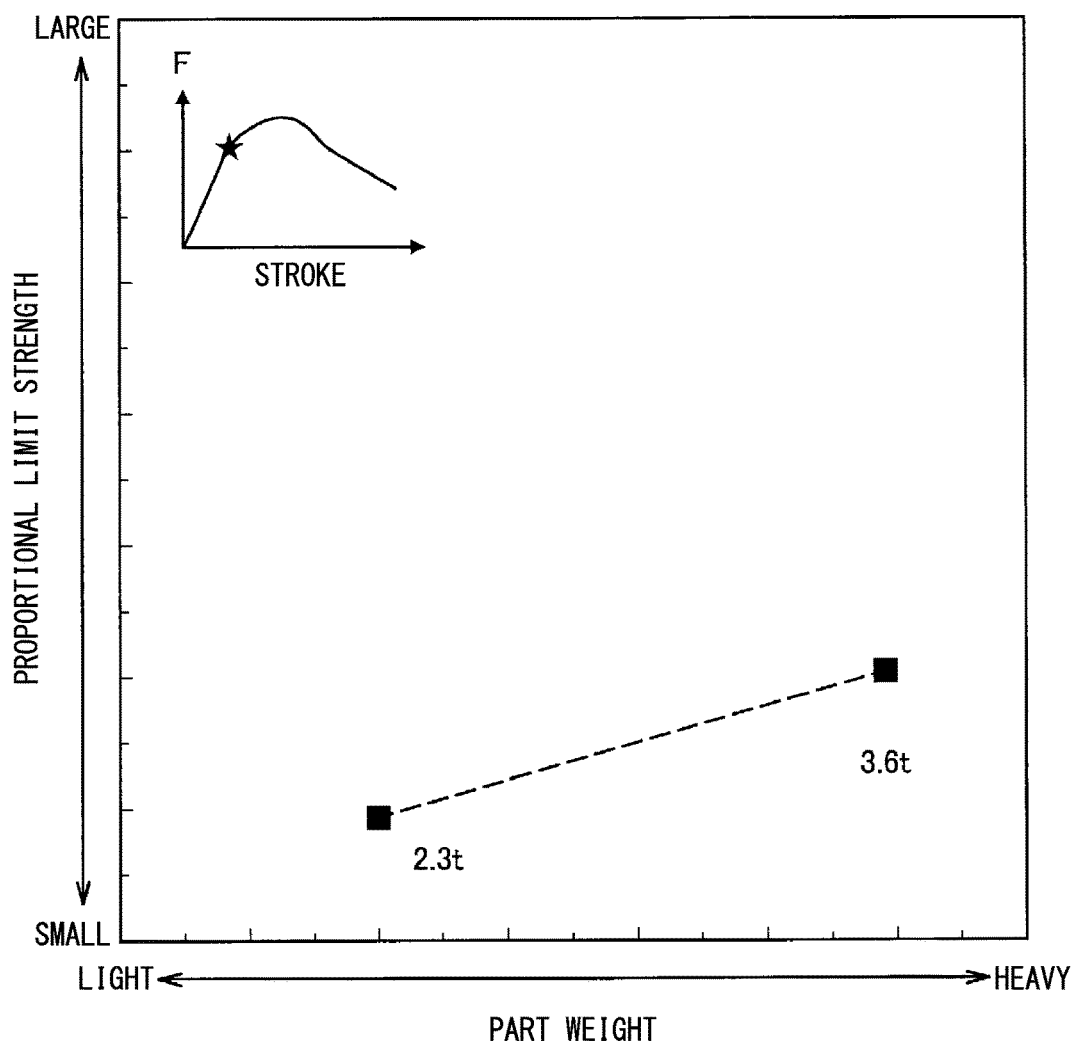
FIG. 11 is a graph illustrating a relationship between a weight of a lower arm and a proportional limit strength.
Figure 12:
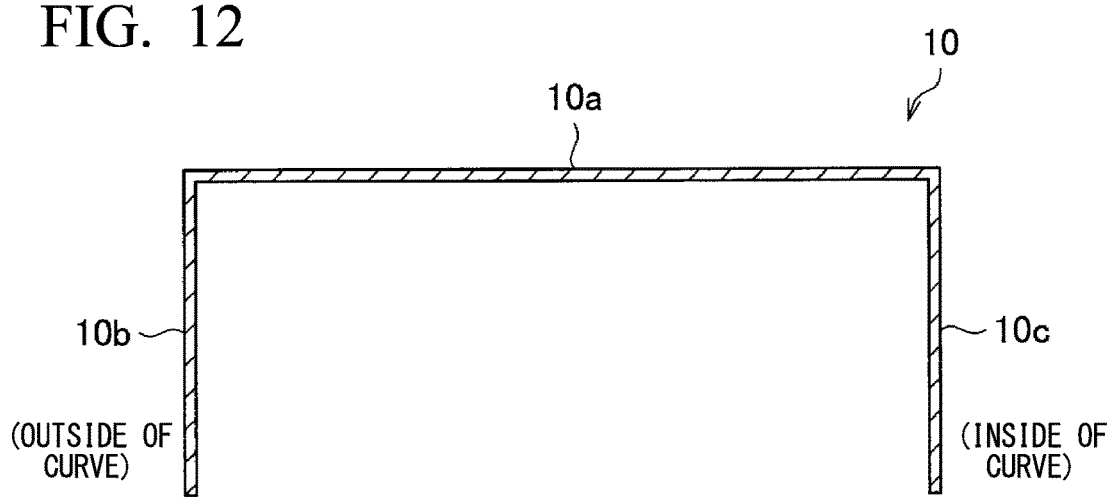
FIG. 12 is a schematic cross-sectional view illustrating a structural member having a substantially U-shaped cross section in a structural member width direction.

Here, FIG. 11 is a graph illustrating an example of a relationship between the weight of the lower arm and the proportional limit strength. For simplicity, FIG. 11 illustrates a relationship between weight of a structural member and a proportional limit strength for a structural member 10 having a substantially U-shaped cross section in a structural member width direction as illustrated in FIG. 12. An outline of the structural member 10 having a substantially U-shaped cross section illustrated in FIG. 12 has a curved shape as illustrated in FIG. 1 similar to the structural member 100 according to the present embodiment, and includes a top sheet portion 10a having a curved shape, an outer wall portion 10b on the outside of the curve, and an inner wall portion 10c on the inside of the curve. The structural member 10 does not have the closed cross-sectional portion 105 on the inside of the curve as compared to the cross section in the structural member width direction illustrated in FIGS. 2 to 6, but has the open cross section as a whole similar to the structural member 100.

In FIG. 11, as an example, for the lower arm, the proportional limit strength when a sheet thickness was set to 2.3 mm and 3.6 mm using a steel sheet having a tensile strength of 980 MPa was examined. As a result, as illustrated in FIG. 11, as the sheet thickness is smaller and the weight (that is, the part weight) of the lower arm is smaller, the proportional limit strength is smaller.

[2-2. Structural Member Having Cross-Sectional Asymmetry]

The present inventor has studied a structure of the structural member 100 capable of reducing the out-of-plane deformation, based on the above finding that the structural member 100 is more easily out-of-plane deformed under the influence of the compressive stress generated inside the curve as the area of the top sheet portion 101 increases. As a result, the present inventor have conceived the structural member 100 having the curved shape in which the cross section in the structural member width direction is the open cross section and the closed cross-sectional portion 105 is provided on the inside of the curve, as illustrated in FIGS. 2 to 6. The cross section of the structural member 100 in the structural member width direction is asymmetric. Hereinafter, the cross-sectional asymmetry of the structural member 100, which is a shape characteristic of the structural member 100 according to the present embodiment, will be described.

(1) Shape Comparison

The structural member 100 according to the present embodiment has the shape in which the cross section in the structural member width direction is the open cross section and the closed cross-sectional portion 105 is provided on the inside of the curve. The configuration is characterized in that the out-of-plane deformation hardly occurs and the part weight can be reduced. Here, FIG. 13 schematically illustrates likelihood of occurrence of the out-of-plane deformation in a case where the cross section in the structural member width direction is a closed cross section, and in a case where the cross section is an open cross section. In the case where the cross section in the structural member width direction is the open cross section, a structural member having a symmetrical cross section such as the structural member 10 having a substantially U-shaped cross section in the structural member width direction shown in FIG. 12 and a structural member having an asymmetrical cross section which is the structural member 100 according to the present embodiment are illustrated. With respect to the likelihood of the occurrence of the out-of-plane deformation, as described with reference to FIG. 10, a state where a load is applied to a point (point $P_1$ in FIG. 10) on one end side of each of the curved top sheet portions 10a and 101 of the structural members 10 and 100 is considered.

First, in the case where the cross section in the structural member width direction is the closed cross section, the cross-sectional shape does not easily collapse even when a load is applied, but the part weight increases. In the case where the cross section in the structural member width direction is the open cross section, the part weight can be reduced as compared to the case of the closed cross section. However, if the cross section is symmetric, the inner wall portion on the inside of the curve is open when a load is applied, and thus, the cross-sectional shape easily collapses. Accordingly, when the cross section in the structural member width direction is the open cross section which is symmetrical at the center the length in the width direction, the out-of-plane deformation easily occurs.

Therefore, like the structural member 100 according to the present embodiment, the cross section in the structural member width direction is set to the open cross section to reduce to the weight, and the closed cross-sectional portion 105 is provided on the inside of the curve so as to withstand the compressive stress generated inside the curve. The closed cross-sectional portion 105 is provided on the inside of the curve of the structural member, and thus, the cross section in the structural member width direction is an asymmetric open cross section at the center of the length in the width direction, and it is possible to effectively suppress the asymmetrically generated compressive stress.

Figure 14:
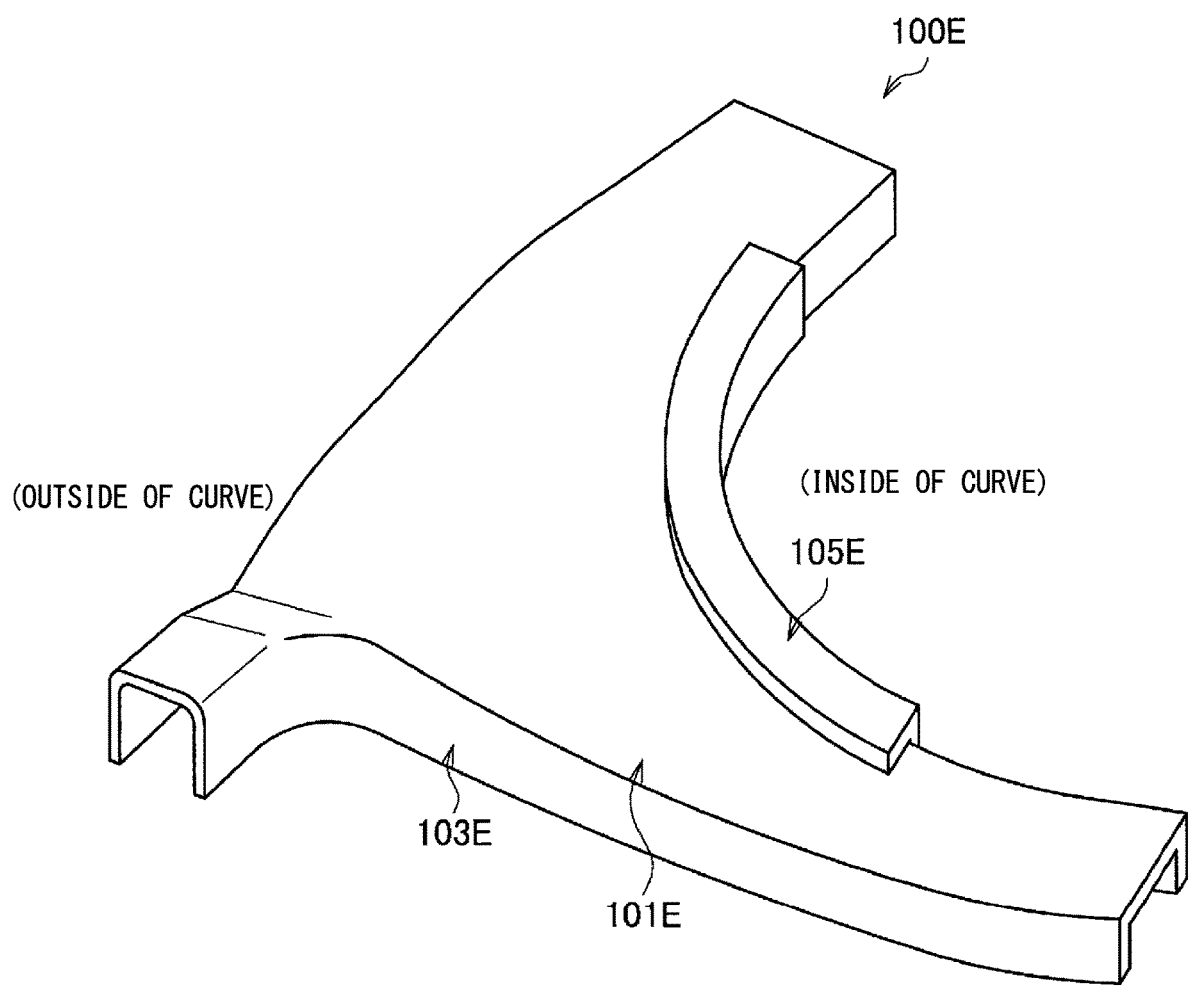
FIG. 14 is a schematic perspective view illustrating a modification example of a shape of the vehicle structural member according to the embodiment.

Moreover, in the present embodiment, as in the structural member 100 of FIG. 1, the example is illustrated in which the closed cross-sectional portion 105 is formed in the entire region on the inside of the curve of the structural member 100. However, the region where the closed cross-sectional portion 105 is formed on the inside of the curve of the structural member 100 is not limited to the example. For example, the closed cross-sectional portion 105 may be formed in a partial region on the inside of the curve of the structural member 100. FIG. 14 is a schematic perspective view illustrating a modification example of the shape of the structural member 100 of the vehicle according to the present embodiment. As illustrated in FIG. 14, a closed cross-sectional portion 105E of a structural member 100E according to the present modification example may be formed in a partial region on an inside of a curve of the structural member 100E. The structural member 100E includes a top sheet portion 101E having a curved shape, a wall portion 103E which is provided along an outside of a curve of the top sheet portion 101E, and a closed cross-sectional portion 105E which is provided in a portion of an inside of the curve of the top sheet portion 101E. Even when the closed cross-sectional portion 105E is partially formed in the structural member 100E, it is possible to suppress the occurrence of the out-of-plane deformation. In particular, as illustrated in FIG. 14, in the inside of the curve of the structural member 100E, a portion which is recessed toward the outside of the curve in a middle portion in a curving direction is a portion where the influence of the out-of-plane deformation is relatively larger than other portions. Therefore, by forming the closed cross-sectional portion 105E in this region, it is possible to more reliably suppress the occurrence of the out-of-plane deformation. Moreover, in a case where the closed cross-sectional portion 105E is formed by using other members as illustrated in FIGS. 3 to 5 or the like, an amount of other members required for forming the closed cross-sectional portion 105E can be reduced. Therefore, it is possible to suppress an increase in the weight of the structural member 100E.

(2) Specific Configuration

Hereinafter, details of the structural member according to the present embodiment will be described with reference to FIGS. 15 to 18.

(Specification of Cross-Sectional Asymmetry by Cross-Sectional Area)

Figure 15:
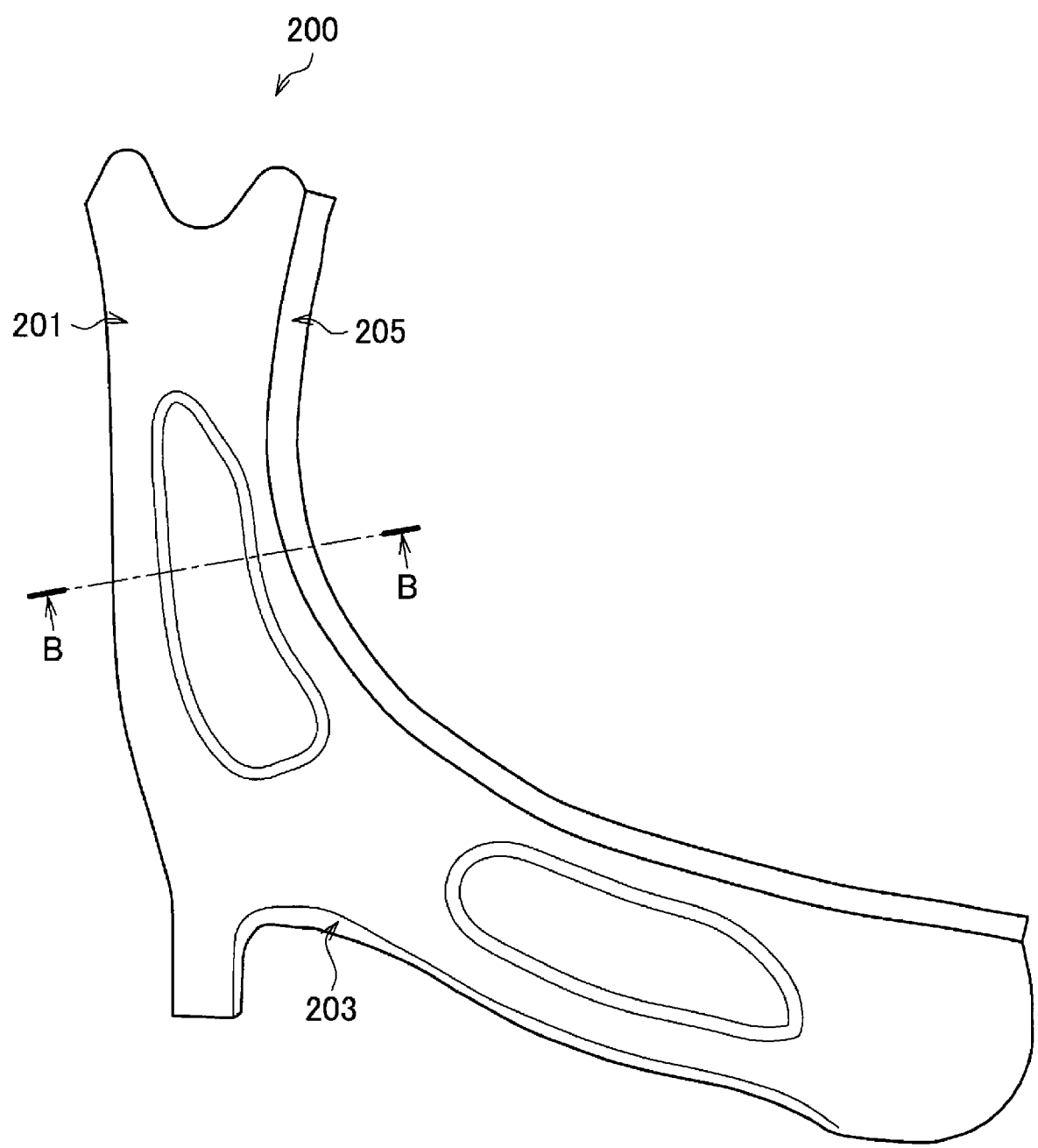
FIG. 15 is a schematic plan view illustrating an example of the structural member having a curved shape according to the embodiment.

First, the asymmetry of the cross section in the structural member width direction according to the present embodiment will be described with reference to FIGS. 15 and 16. The asymmetry of the cross section in the structural member width direction is defined based on a cross-sectional area of the cross section. FIG. 15 is a schematic plan view illustrating an example of a structural member 200 having a curved shape according to the present embodiment. FIG. 16 is a schematic view of a cross section taken along the cutting-plane line B-B of FIG. 15.

Figure 16:
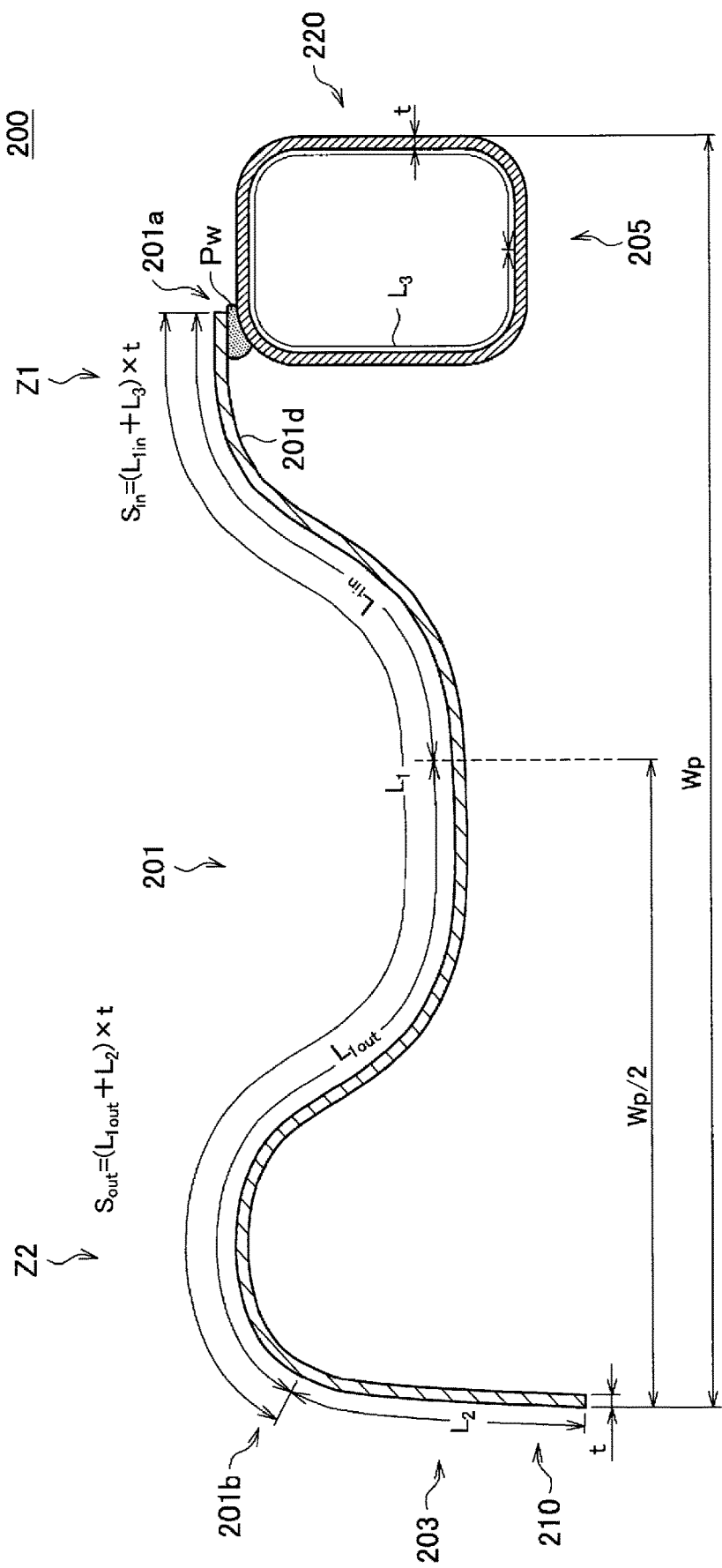
FIG. 16 is a schematic view of a cross section taken along a cutting-plane line B-B of FIG. 15.

As illustrated in FIGS. 15 and 16, the structural member 200 includes a top sheet portion 201 having a curved shape, a wall portion 203 which provided along an outside of a curve of the top sheet portion 201, and a closed cross-sectional portion 205 which is provided on an inside of the curve of the top sheet portion 201. The structural member 200 has the configuration of the structural member 100D illustrated in FIG. 5. That is, the top sheet portion 201 and the wall portion 203 are constituted by a first steel sheet 210, and the closed cross-sectional portion 205 is constituted by a second steel sheet 220. The closed cross-sectional portion 205 has a rectangular cross section, and a portion of an outer surface of the closed cross-sectional portion 205 is fixed to the lower surface 201d of the top sheet portion 201 by welding. In this example, it is assumed that the first steel sheet 210 and the second steel sheet 220 have the same sheet thickness t.

In the structural member 200, a cross-sectional area of a cross section in the structural member width direction is represented by a product of a sheet thickness t of a steel sheet and a total line length L. The total line length L is a sum of a line length $L_1$ of the top sheet portion 201, a line length $L_2$ of the wall portion 203, and a line length $L_3$ of the closed cross-sectional portion 205 which constitute the structural member 200. Further, the structural member 200 has a first region Z1 on a first edge portion 201a side (the inside of the curve) from a center of a structural member width Wp and a second region Z2 on a second edge portion 201b side (the outside of the curve) from the center of the structural member width Wp, in a vertical cut plane (cut plane along line B-B) along the structural member width direction. Moreover, the cross section in the structural member width direction is asymmetric means that a ratio $S_{in}/S_{out}$ of the cross-sectional area $S_{in}$ of the first region Z1 with respect to a cross-sectional area $S_{out}$ of the second region Z2 satisfies the following expression (1). In this case, the cross-sectional area $S_{in}$ and the cross-sectional area $S_{out}$ are represented by the following expression (1-1) and (1-2). In addition, $L_{1in}$ indicates a line length on the inside of the curve from the center of the structural member width Wp of the line length $L_1$ of the top sheet portion 201, and $L_{1out}$ indicates a line length on the outside of the curve from the center of the structural member width Wp of the line length $L_1$ of the top sheet portion 201.

$$1.15 \leq S_{in}/S_{out} \leq 2.65 \quad (1)$$

$$S_{in}=(L_{1in}+L_3) \times t \quad (1\text{-}1)$$

$$S_{out}=(L_{1out}+L_2) \times t \quad (1\text{-}2)$$

As illustrated in FIG. 16, in the structural member 200 having the curved shape in which the cross section in the structural member width direction is the open cross section and the closed cross-sectional portion 205 is provided on the inside of the curve, the cross-sectional asymmetry satisfying the expression (1) is obtained. Accordingly, compared to the outside of the curve from the neutral line Lc (refer to FIG. 10), more mass is disposed on the inside of the curve from the neutral line Lc. Thereby, the occurrence of the out-of-plane deformation of the structural member 200 can be suppressed, and the front-rear bending strength can increase. Moreover, the structural member 200 has the cross-sectional asymmetry satisfying the expression (1). Accordingly, compared to the outside of the curve, the mass is not disposed too much on the inside of the curve, and it is possible to prevent the neutral line Lc from moving to the inside of the curve and lowering weight efficiency.

Furthermore, preferably, the cross section in the structural member width direction is asymmetrical means that the ratio $S_{in}/S_{out}$ of the cross-sectional area $S_{in}$ of the first region Z1 to the cross-sectional area $S_{out}$ of the second region Z2 satisfies the following expression (1').

$$1.15 \leq S_{in}/S_{out} \leq 2.35 \quad (1')$$

As illustrated in FIG. 16, in the structural member 200 having the curved shape in which the cross section in the structural member width direction is the open cross section and the closed cross-sectional portion 205 is provided on the inside of the curve, the cross-sectional asymmetry satisfying the expression (1') is obtained. Accordingly, not only the same effect as in the case where the expression (1) is satisfied is obtained, but also the mass of the structural member 200 is further reduced. As a result, the weight of the structural member 200 is further reduced.

In the cross-sectional area, in a case where the closed cross-sectional portion 205 of the structural member 200 is filled with a resin or in a case where the closed cross-sectional portion 205 is formed of a solid member, the portion is also included in the cross-sectional area and the expression (1-1) is calculated. Moreover, in the above descriptions, the first steel sheet 210 and the second steel sheet 220 have the same thickness t. However, the first steel sheet 210 and the second steel sheet 220 may have different sheet thicknesses. For example, in the structural member 200 of FIG. 16, when the sheet thickness of the first steel sheet 210 is denoted by $t_1$ and the sheet thickness of the second steel sheet 220 is denoted by $t_2$, the cross-sectional area $S_{in}$ and the cross-sectional area $S_{out}$ may be calculated from the following expression (2-1) and (2-2) and a cross-sectional area ratio $S_{in}/S_{out}$ may be calculated based on the expression (1) or (1').

$$S_{in}=(L_{1in} \times t_1)+(L_3 \times t_2) \quad (2\text{-}1)$$

$$S_{out}=(L_{1out}+L_2) \times t_1 \quad (2\text{-}2)$$

In a case where the closed cross-sectional portion 105 is formed of the same steel sheet as the steel sheet forming the top sheet portion 101 as in the configuration example A of FIG. 2, the cross-sectional area ratio $S_{in}/S_{out}$ can be obtained in the same manner as described above. Specifically, the total line length L is the sum of the line length $L_1$ of the top sheet portion 101, the line length $L_2$ of the wall portion 103, and the line length $L_3$ of the closed cross-sectional portion 105 that constitute the structural member 100A. Moreover, $L_{1in}$ indicates a line length on the inside of the curve from the center of the structural member width of the line length $L_1$ of the top sheet portion 101, and $L_{1out}$ indicates a line length on the outside of the curve from the center of the structural member width of the line length $L_1$ of the top sheet portion 101. In this case, the cross-sectional area $S_{in}$ and the cross-sectional area $S_{out}$ are represented using the above equations (1-1) and (1-2), and the cross section of the structural member 100A in the structural member width direction is asymmetric so that the cross-sectional area ratio $S_{in}/S_{out}$ satisfies the above expressions (1) or (1'). Moreover, when the closed cross-sectional portion 105 is formed of a plurality of members as in the configuration examples B and C in FIGS. 3 and 4, similar to the above, the cross sections of the structural members 100B and 100C in the structural member width direction are asymmetric so that the cross-sectional area ratio $S_{in}/S_{out}$ satisfies the above expressions (1) or (1').

In addition, in the descriptions of the configuration examples B and C, the first steel sheets 110B and 110C and the second steel sheets 120B and 120C have the same sheet thickness t. However, the first steel sheets 110B and 110C and the second steel sheets 120B and 120C may have different sheet thicknesses. For example, in the structural member 100B of FIG. 3, when the sheet thickness of the first steel sheet 110B is denoted by $t_1$ and the sheet thickness of the second steel sheet 120B is denoted by $t_2$, the cross-sectional area and the cross-sectional area $S_{out}$ may be calculated from the following expression (2-3) and (2-4) and a cross-sectional area ratio $S_{in}/S_{out}$ may be calculated based on the expression (1) or (1'). Moreover, a line length $L_{3-1}$ is a line length of a portion along the first steel sheet 110B of the line length $L_3$ of the closed cross-sectional portion 105, and a line length $L_{3-2}$ is a line length of a portion along the second steel sheet 120B of the line length $L_3$ of the closed cross-sectional portion 105.

$$S_{in}=(L_{1in} \times t_1)+(L_{3-1} \times t_1)+(L_{3-2} \times t_2) \quad (2\text{-}3)$$

$$S_{out}=(L_{1out}+L_2) \times t_1 \quad (2\text{-}4)$$

(Structural Member that Effectively Suppress Out-of-Plane Deformation)

The structural member 200 according to the present embodiment particularly exhibits an effect of suppressing the out-of-plane deformation in a case of a shape in which the out-of-plane deformation easily occurs. Specifically, when the sheet thickness, part dimensions, and the strength of the steel sheet constituting the structural member 200 are in the following ranges, a structural member shape having the curved shape may be obtained, in which the cross section in the structural member width direction is an open cross section and the closed cross-sectional portion 205 is provided on the inside of the curve.

When the sheet thickness of the structural member 200 is t≤2.9 mm, it is desirable that the structural member shape according to the present embodiment is adopted. The reason for this is because, as illustrated in FIG. 11, when the sheet thickness is small and the out-of-plane deformation easily occurs, a value of the proportional limit strength is small.

Figure 17:
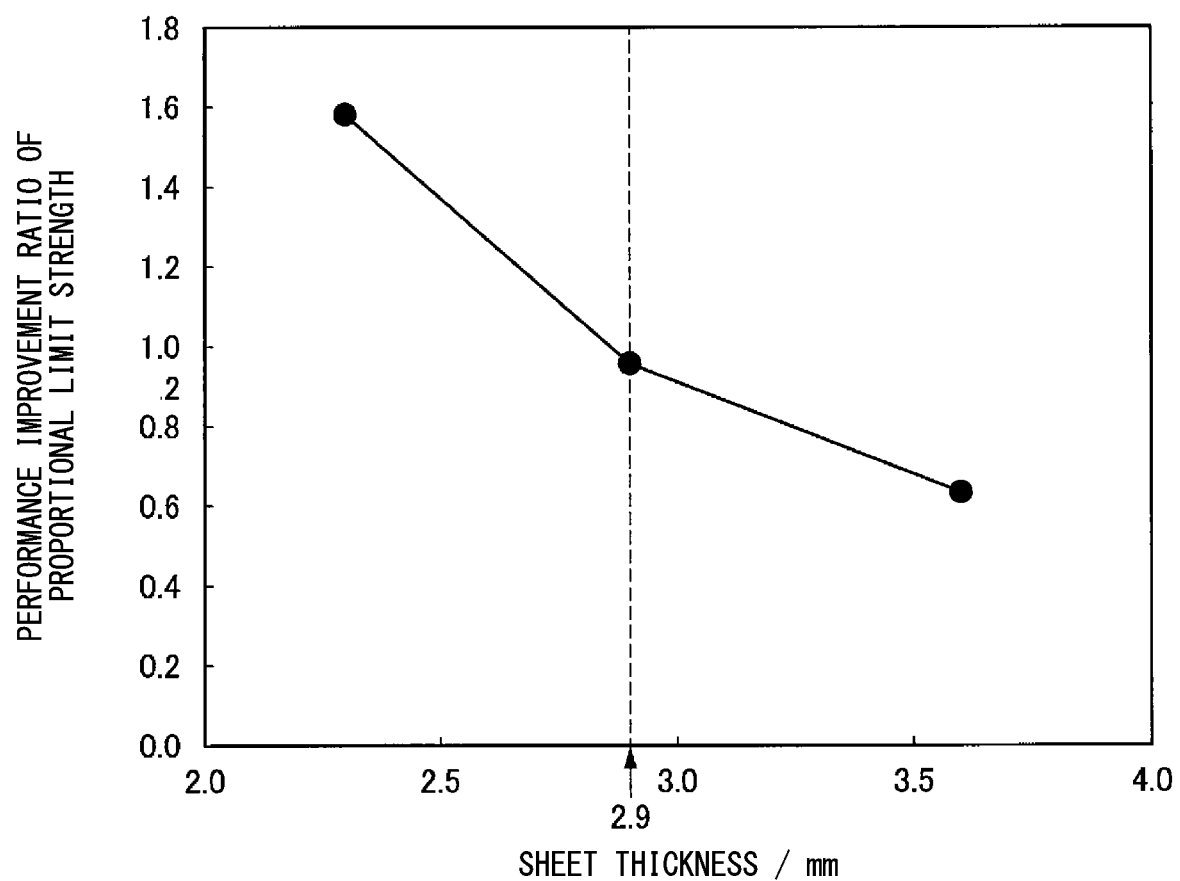
FIG. 17 is a graph illustrating a relationship between a sheet thickness and a performance improvement ratio of a proportional limit strength of a structural member.

FIG. 17 illustrates a relationship between the sheet thickness of the structural member 200 and a performance improvement ratio of the proportional limit strength of the structural member 200. At the same sheet thickness, when the proportional limit strength in a case where the shape of the structural member 200 is set to the structure example B illustrated in FIG. 3 is denoted by $P_1$ and the proportional limit strength in a case where the shape of the structural member 200 is set to the substantially U-shaped cross section illustrated in FIG. 12 is denoted by $P_2$, the performance improvement ratio of the proportional limit strength is obtained by $(P_1-P_2)/P_2$. As the value of the performance improvement ratio of the proportional limit strength increases, an effect of increasing the proportional limit strength in a case where the structural member shape according to the present embodiment is applied increases.

As illustrated in FIG. 17, as the sheet thickness increases, the performance improvement ratio of the proportional limit decreases, and it can be seen that the proportional limit is not significantly improved even when the cross-sectional shape of the structural member 200 is the cross-sectional shape of the structural example B. Specifically, when the sheet thickness was 3.6 mm, the performance improvement ratio of the proportional limit strength was 0.63. The performance improvement ratio of the proportional limit increases as the sheet thickness decreases, and the proportional limit is improved by setting the cross-sectional shape of the structural member 200 to the cross-sectional shape of the structural example B. In particular, in a case where a sheet thickness of a thin material is 2.9 mm or less, the performance improvement ratio of the proportional limit increases. Specifically, when the sheet thickness was 2.9 mm, the performance improvement ratio of the proportional limit strength was 0.96. In addition, when the sheet thickness was 2.3 mm, the performance improvement ratio of the proportional limit strength was 1.58. Therefore, when the sheet thickness t of the structural member 200 is 2.9 mm or less, it is desirable that the structural member shape according to the present embodiment is adopted.

Further, it is necessary to increase the sheet thickness in order to secure the proportional limit strength required for the structural member 200. However, if the sheet thickness increases, the part weight also increases. If the sheet thickness t can be set to 2.9 mm or less, the part weight can be reduced by 20% or more. Therefore, in a case where the sheet thickness t of the structural member 200 is 2.9 mm or less, it is desirable that the structural member shape according to the present embodiment is adopted. Here, the sheet thickness of the structural member 200 may be the largest of the sheet thicknesses of the members constituting the structural member 200.

As the area of the top sheet portion 201 increases, the out-of-plane deformation of the structural member 200 increases. The area of the top sheet portion 201 can be calculated from the arm length W of the structural member 200 and the structural member width Wp. That is, as the arm length W increases and the structural member width Wp increases, the structural member shape according to the present embodiment is adopted, and thus, the occurrence of the out-of-plane deformation in the structural member 200 can be effectively suppressed.

Figure 18:
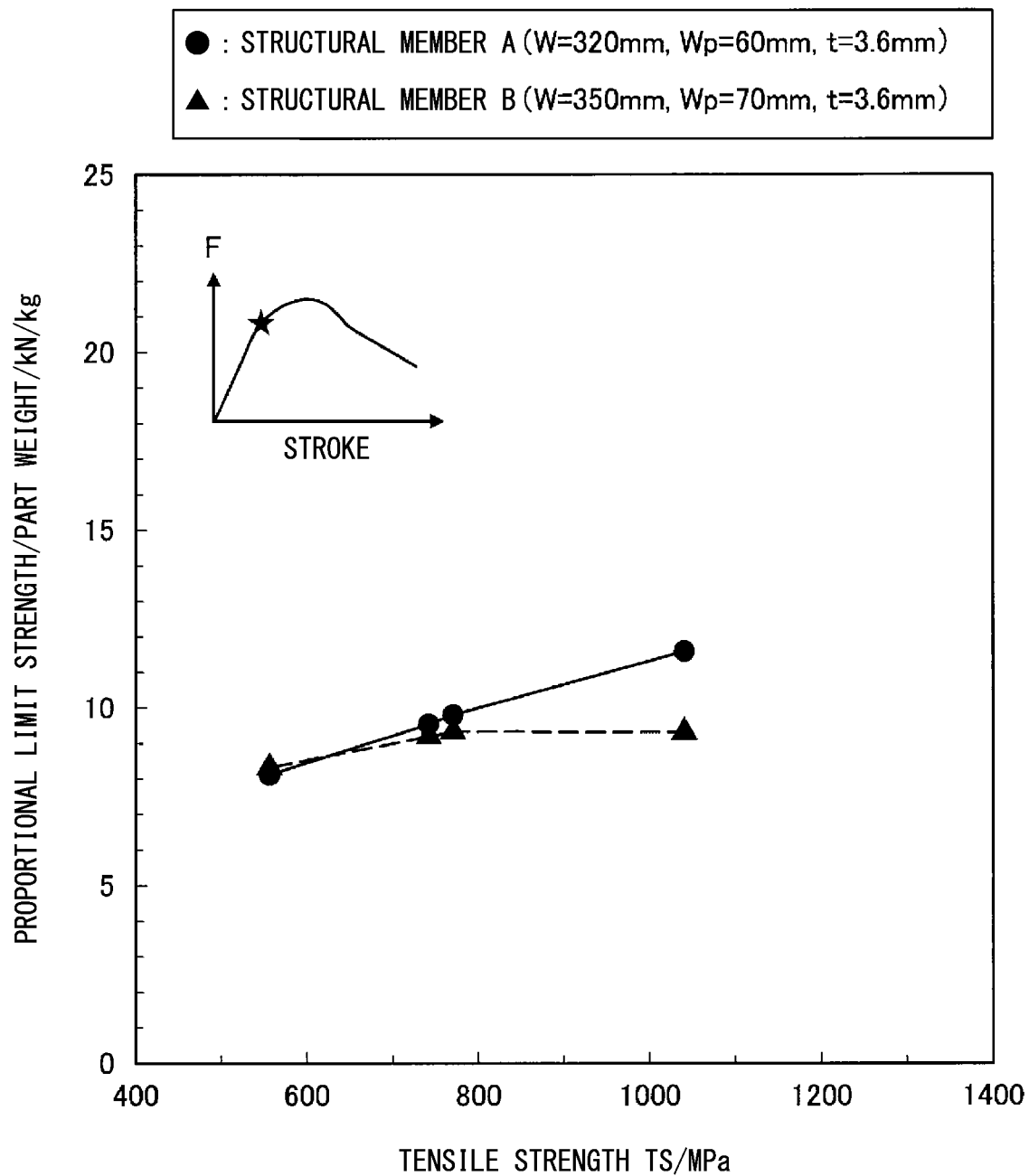
FIG. 18 is a graph illustrating a relationship between a tensile strength TS and a proportional limit strength per unit part weight.

Here, FIG. 18 illustrates a relationship between tensile strength and the proportional limit strength per unit part weight for structural members A and B having two different part dimensions. The structural member A has a shape having the arm length W of 320 mm and the structural member width Wp of 60 mm, and the structural member B has a shape having the arm length W of 350 mm and the structural member width Wp of 70 mm. The sheet thickness of each of the structural members A and B is 3.6 mm. That is, the area of the top sheet portion 201 is larger in the structural member B than in the structural member A, and thus, the out-of-plane deformation is more easily generated in the structural member B.

Referring to FIG. 18, in the structural member A, the proportional limit strength per unit part weight also increases as the tensile strength increases. In the structural member B having a larger area of the top sheet portion 201 than the structural member A, the value of the proportional limit strength per unit part weight does not exceed even if the tensile strength increases and is constant. That is, in a structural member having a large area of the top sheet portion 201 and a large out-of-plane deformation, it can be said that the proportional limit strength does not increase even if the strength of the steel sheet increases. Therefore, in a structural member such as the structural member B in which the out-of-plane deformation easily occurs, the structural member shape according to the present embodiment is adopted, and thus, it is possible to effectively suppress the occurrence of the out-of-plane deformation in the structural member. For example, when the arm length W satisfies W≥350 mm, especially W≥370 mm, it is desirable that the structural member shape according to the present embodiment is adopted. In addition, when the structural member width Wp satisfies Wp≥70 mm, particularly when Wp≥75 mm, it is desirable that the structural member shape according to the present embodiment is adopted.

Moreover, in the structural member 200, as the strength of the steel sheet forming the structural member 200 increases, an elastic range is lengthened and the out-of-plane deformation more easily occurs. From FIG. 18, it can be seen that the proportional limit strength per unit part weight increases as the tensile strengths of both structural members A and B increase. Therefore, in a case where the steel sheet forming the structural member 200 is a high strength material, the structural member shape according to the present embodiment is adopted, and thus, the occurrence of the out-of-plane deformation in the structural member 200 can be effectively suppressed. For example, from FIG. 18, in the structural member B in which the out-of-plane deformation easily occurs, regarding the tensile strength Ts, when the proportional limit strength does not increase even if the strength of the steel sheet increases, that is, when Ts≥780 MPa, it is desirable that the structural member shape according to the present embodiment is adopted.

EXAMPLES

With respect to the structural member 100 according to the present invention, a mass (part mass) of the structural member required to secure the performance of the proportional limit strength of 25 kN was examined. As for the structural member 100 of the present invention, the structural member 100D of the configuration example D illustrated in FIG. 5 was applied to Examples 1, 2, and 5 to 7, the structural member 100A of the configuration example A illustrated in FIG. 2 was applied to Example 3, the structural member 100B of the configuration example B illustrated in FIG. 3 was applied to Example 4, the mass (part mass) of the structural member 100 required to secure the performance of the proportional limit strength of 25 kN was calculated. Further, with respect to a configuration of a closed cross-sectional shape having wall portions on the outside and inside of the curve illustrated in FIG. 13, as Comparative Example 1, the mass (part mass) of the structural member required to secure the performance of the proportional limit strength of 25 kN as an example of a value required for a vehicle was calculated. The results are illustrated in Table 1 below. In Table 1, the cross-sectional area ratio $S_{in}/S_{out}$ between the cross-sectional area $S_{out}$ and the cross-sectional area $S_{in}$ calculated based on the expressions (1), (1-1), and (1-2) or the expressions (1), (2-1), and (2-2) is illustrated.

TABLE 1

| | Part mass [kg] | Cross-sectional area ratio $S_{in}/S_{out}$ | Top sheet portion sheet thickness [mm] | Closed cross-sectional portion sheet thickness [mm] | Characteristics |
|---|---|---|---|---|---|
| Comparative Example 1 | 2.4 | 1.00 | 4.0 | 4.0 | Both side walls (FIG. 13) |
| Example 1 | 1.9 | 1.15 | 2.9 | 1.8 | Configuration example D (FIG. 5) |
| Example 2 | 1.7 | 1.37 | 2.3 | 2.0 | Configuration example D (FIG. 5) |
| Example 3 | 1.8 | 1.48 | 2.3 | — | Configuration example A (FIG. 2) |
| Example 4 | 1.8 | 1.52 | 2.3 | 2.0 | Configuration example B (FIG. 3) |
| Example 5 | 1.8 | 1.99 | 2.0 | 3.0 | Configuration example D (FIG. 5) |
| Example 6 | 1.9 | 2.37 | 1.9 | 3.6 | Configuration example D (FIG. 5) |
| Example 7 | 2.0 | 2.68 | 1.8 | 4.0 | Configuration example D (FIG. 5) |

From Table 1, the shapes of the structural members of Examples 1 to 7 were adopted, the mass (part mass) of the structural member 100 required to secure the performance of the proportional limit strength of 25 kN was reduced by about 20 to 30% as compared with Comparative Example 1. Further, as illustrated in Examples 1 to 6, in a case where the cross-sectional area ratio was 2.65 or less, the part mass was smaller than 2.0 kg, and a weight reduction effect was obtained. Moreover, as illustrated in Examples 1 to 5, when the cross-sectional area ratio was 2.35 or less, the part mass was smaller than 1.9 kg, and a higher weight saving effect was obtained. This indicates that the configuration of the structural member 100 of the present invention can achieve the required proportional limit strength while securing the weight efficiency of the structural member 100.

In addition, for the structural member 100 according to the present embodiment, a relationship between the aspect ratio OP and an amount of out-of-plane deformation of the closed cross-sectional portion 105 was investigated. Specifically, in a case where a load was applied to the point P1 in FIG. 10 of the structural member 100 and the structural member 100 was deformed by 10 mm in the front-rear direction of the vehicle body, the amount of out-of-plane deformation was examined. In Table 2, when a longest length in the structural member width direction (lateral direction) in the closed cross-sectional portion 105 of the structural member 100 was denoted by α, and a longest length in the direction (vertical direction) perpendicular to the structural member width direction in the closed cross-sectional portion 105 was denoted by β, a relationship between the value of the aspect ratio α/β and the amount of out-of-plane deformation amount was summarized.

TABLE 2

| | α [mm] | β [mm] | α/β | Amount of out-of-plane deformation |
|---|---|---|---|---|
| Comparative Example 2 | 5 | 20 | 0.25 | 7.2 |
| Comparative Example 3 | 20 | 5 | 4 | 9.2 |
| Example 8 | 10 | 20 | 0.5 | 6.1 |
| Example 9 | 13.5 | 20 | 0.75 | 4.0 |
| Example 10 | 20 | 20 | 1 | 2.3 |

TABLE 2-continued

| | α [mm] | β [mm] | α/β | Amount of out-of-plane deformation |
|---|---|---|---|---|
| Example 11 | 20 | 13.5 | 1.33 | 4.5 |
| Example 12 | 20 | 10 | 2 | 6.9 |

From Table 2, it was shown that by adopting the aspect ratio α/β of the closed cross-sectional portion 105 of Examples 8 to 12, the amount of out-of-plane deformation was 7.0 mm or less within a predetermined reference range, and thus, a reinforcing effect by the closed cross-sectional portion 105 was fully exhibited. In the aspect ratios α/β of Comparative Examples 2 and 3, the closed cross-sectional portion 105 had a vertically long or horizontally long flat shape. As a result, the amount of out-of-plane deformation exceeded a predetermined reference range and the reinforcing effect by the closed cross-sectional portion 105 was not sufficiently obtained. Accordingly, it was shown that a sufficient reinforcing effect could be exerted by setting the closed cross-sectional portion 105 of the structural member 100 of the present invention to a predetermined aspect ratio.

As described above, the preferred embodiments of the present invention are described in detail with reference to the accompanying drawings. However, the present invention is not limited to the embodiments. It is obvious that a person skilled in the art to which the present invention pertains can conceive various changes or modifications within a scope of a technical idea described in claims, and it is understood that the various changes and modifications also belong to a technical scope of the present invention.

BRIEF DESCRIPTION OF THE REFERENCE SYMBOLS 100, 100A to 100D', 200: structural member
101, 201: top sheet portion
101a, 201a: first edge portion
101b, 201b: second edge portion
101c: upper surface
101d: lower surface
103, 203: wall portion
105, 105', 205: closed cross-sectional portion
110B, 110C, 110D, 210: first steel sheet
120B, 120C, 120D, 220: second steel sheet
130: resin filler
Z1: first region
Z2: second region

The invention claimed is:

1. A structural member comprising:
a top sheet portion which has a first edge portion and a second edge portion facing the first edge portion;
a wall portion which extends from the second edge portion in a direction intersecting the top sheet portion; and
a closed cross-sectional portion which is provided in the first edge portion,
wherein the first edge portion is curved toward an inside of the top sheet portion in a plan view with respect to the top sheet portion,
wherein when a distance from the first edge portion to the second edge portion of the structural member is referred to as a structural member width,
the closed cross-sectional portion is provided on an inside of a curve of the top sheet portion and forms a closed cross section on a vertical cut plane of the structural member along a direction of the structural member width,
the vertical cut plane of the structural member along the direction of the structural member width has an open cross section, and
a shape of the vertical cut plane of the structural member including the closed cross-sectional portion is asymmetric with respect to a center of a length of the structural member width,
wherein the structural member has a first region on a side of the first edge portion from the center of the length of the structural member width and a second region on a side of the second edge portion from the center of the structural member width, in the vertical cut plane,
wherein in the vertical cut plane including the closed cross-sectional portion, a cross-sectional area ratio $S_{in}/S_{out}$ of a cross-sectional area $S_{in}$ of the first region to a cross-sectional area $S_{out}$ of the second region satisfies the following relational expression, $1.15 \leq S_{in}/S_{out} \leq 2.65$, and wherein a sheet thickness of the structural member is 2.9 mm or less.

2. The structural member according to claim 1, wherein the top sheet portion, the wall portion, and the closed cross-sectional portion are formed of one member.

3. The structural member according to claim 1, wherein the closed cross-sectional portion is formed of one member different from a member forming the top sheet portion.

4. The structural member according to claim 1, wherein the closed cross-sectional portion is provided adjacent to the top sheet portion.

5. The structural member according to claim 1, wherein the closed cross-sectional portion is formed of a plurality of members.

6. The structural member according to claim 5, wherein the structural member is formed of
a first member which forms the top sheet portion, the wall portion, and a portion of the closed cross-sectional portion, and
a second member which forms the closed cross-sectional portion together with the first member,
wherein both ends of the second member are welded to the first member.

7. The structural member according to claim 1, wherein in the vertical cut plane, when a longest length in the direction of the structural member width in the closed cross-sectional portion is denoted by α and a longest length in a direction perpendicular to the direction of the structural member width in the closed cross-sectional portion is denoted by β, α/β satisfies the following relational expression, $3/7 \leq \alpha/\beta \leq 7/3$.

8. The structural member according to claim 1, wherein a cross-sectional shape of the closed cross-sectional portion is rectangular.

9. The structural member according to claim 1, wherein the closed cross-sectional portion is formed of a hollow member.

10. The structural member according to claim 9, wherein a hollow portion of the closed cross-sectional portion is filled with a resin filler.

11. The structural member according to claim 1, wherein the closed cross-sectional portion is formed of a solid member.

12. The structural member according to claim 1, wherein the structural member is a structural member of a vehicle.

13. The structural member according to claim 1, wherein the structural member is a suspension part of a vehicle.

14. The structural member according to claim 1, wherein the structural member has a tensile strength of 780 MPa or more.

15. The structural member according to claim 1, wherein an arm length of the structural member is 350 mm or more.

16. The structural member according to claim 1, wherein the structural member width of the structural member is 70 mm or more.

17. The structural member according to claim 1, wherein in a vertical cut plane, a longest length from the top sheet portion to a bottom surface of the closed cross-sectional portion is shorter than a longest length from the top sheet portion to a bottom of the wall portion.

* * * * *